United States Patent
Bussler et al.

(10) Patent No.: US 10,324,772 B2
(45) Date of Patent: Jun. 18, 2019

(54) METHOD AND SYSTEM FOR DATA INSTANCE-BASED AUTOMATIC MESSAGE MAP CONSTRUCTION

(71) Applicant: Oracle International Corporation, Redwood Shores, CA (US)

(72) Inventors: Christoph Bussler, Morgan Hill, CA (US); Herbert Stiel, San Francisco, CA (US); Edward Macosky, Livermore, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/341,867

(22) Filed: Nov. 2, 2016

(65) Prior Publication Data

US 2018/0121259 A1     May 3, 2018

(51) Int. Cl.
*G06F 9/54* (2006.01)

(52) U.S. Cl.
CPC ..................... *G06F 9/541* (2013.01)

(58) Field of Classification Search
CPC .............................. G06F 9/541; G06F 9/546
See application file for complete search history.

(56) References Cited

U.S. PATENT DOCUMENTS

| | | | |
|---|---|---|---|
| 6,256,676 B1 | 7/2001 | Taylor et al. | |
| 7,003,773 B2 | 2/2006 | Hoennig et al. | |
| 7,499,899 B2 | 3/2009 | Siegel et al. | |
| 7,650,325 B2 | 1/2010 | Bader et al. | |
| 8,443,374 B2 | 5/2013 | Li et al. | |
| 2002/0116454 A1 | 8/2002 | Dyla et al. | |
| 2004/0167986 A1 | 8/2004 | Gilfix et al. | |
| 2007/0198988 A1 | 8/2007 | Kumar et al. | |
| 2009/0172163 A1 | 7/2009 | Carroll et al. | |
| 2009/0201945 A1* | 8/2009 | Llaurency | G06F 17/30569 370/466 |
| 2009/0285224 A1* | 11/2009 | Vayssiere | G06F 9/541 370/401 |
| 2015/0046555 A1* | 2/2015 | Cohen | H04L 51/066 709/206 |

(Continued)

OTHER PUBLICATIONS

"Integration Manager"—Microsoft Great Plains Business Solutions, obtained at http://www.bretabennett.com/dynamics/Docs_Dyn_v6_v7/Customization/IMFactSheet.pdf, copyright 2001, 6 pages.

*Primary Examiner* — Charles E Anya
(74) *Attorney, Agent, or Firm* — Trellis IP Law Group, PC

(57) ABSTRACT

A system and method for facilitating integrating software systems. An example method includes generating a test dataset (also called instance dataset herein); inputting the test dataset to a first software system and a second software system that are to be integrated; triggering a first set of one or more source messages (also called target messages herein) from the first software system and a second set of one or more source messages from the second output message based on the test dataset; receiving the first set of one or more source messages and the second set of one or more source messages; and analyzing the message sets to determine a mapping sufficient to translate messages exchanged between the first and second software systems, such that the messages are readable thereby.

10 Claims, 14 Drawing Sheets

(56) References Cited

U.S. PATENT DOCUMENTS

| | | | | |
|---|---|---|---|---|
| 2015/0180942 A1* | 6/2015 | Kraljic | ................ | H04L 67/2823 |
| | | | | 709/204 |
| 2015/0350016 A1* | 12/2015 | Gundugola | ........... | H04L 41/145 |
| | | | | 709/223 |
| 2016/0028827 A1* | 1/2016 | Ahmed | ................... | G06F 9/541 |
| | | | | 709/206 |
| 2016/0294748 A1* | 10/2016 | Yang | ....................... | H04L 51/32 |

* cited by examiner

METHOD AND SYSTEM FOR DATA INSTANCE-BASED AUTOMATIC MESSAGE MAP CONSTRUCTION

CROSS REFERENCES TO RELATED APPLICATIONS

This application is related to the following application, U.S. Pat. No. 8,443,374 entitled BUSINESS APPLICATION INTEGRATION ADAPTERS MANAGEMENT SYSTEM, issued on May 14, 2013, which is hereby incorporated by reference, as if set forth in full in this specification.

BACKGROUND

The present application relates to computing, and more specifically to software, methods, and accompanying systems for facilitating exchange of information between disparate systems of a computing environment.

Systems and methods for integrating software systems to facilitate intercommunications are employed in various demanding applications, including Enterprise Application Integration (EAI), Business-to-Business (B2B) integration, Cloud Application Integration (CAI), and so on. Such applications often demand efficient and accurate mechanisms for enabling precise translations of different message types, contents, and associated schemas.

A schema may be a specification for describing structures and data elements of content exchanged in a computing environment. A schema may dictate, for example, message content grammar, where the grammar may include rules for specifying content structures, data types, and so on.

Efficient and accurate mechanisms for translating content between systems that employ different schemas can be particularly important for integrating computing resources (e.g., software systems) of enterprise computing environments, which may include thousands of intercommunicating systems, and where imprecise system integration can be particularly problematic and costly.

Messages exchanged between software systems often employ different schemas and associated values. To enable message exchange between systems, the messages are translated or transformed into formats readable by the different systems. As computing environments and accompanying messaging schemas become increasingly complex, increasing demands are placed on methods for accurately translating messages to enable system integration.

Message transformation is often based on transformation maps (also called message maps) that contain instructions (also called mapping rules) for transforming elements of a source message sent from one system into elements of a target message readable by another system. Conventionally, such maps are often manually constructed by a developer based on analysis of different message schemas.

Alternatively, software for facilitating construction of message maps may analyze message schema definitions used by the different systems. However, message map generation based on message schema definitions alone can be undesirably error prone. Available schema definitions may lack sufficient details to enable highly accurate message transformation.

SUMMARY

An example method facilitates integrating software systems, e.g., by enabling translation or transformation of messages between the software systems, which may employ different message schemas and message data element characteristics. The example method includes generating a test dataset (also called an instance dataset herein); inputting the test dataset into a first software system and a second software system that are to be integrated; triggering a first set of one or more source messages (also called original or initial messages herein) from the first software system and a second set of one or more source messages from the second software system, wherein the triggered messages are based on the test dataset; receiving the first set of one or more source messages and the second set of one or more source messages; and analyzing the first set of one or more source messages and the second set of one or more source messages to determine a first transformation and a second transformation, respectively, wherein the first transformation specifies a mapping sufficient to transform one or more subsequent messages output from the first software system into a format readable by the second software system, and wherein the second transformation specifies a mapping sufficient to transform one or more subsequent messages output from the second software system into a format readable by the first software system.

In a more specific embodiment, the example method further includes sending a first message of the first set of one or more source messages to the second software system, thereby triggering a first response message from the second software system; sending a second message of the second set of one or more source messages to the first software system, thereby triggering a second response message from the first software system; and analyzing the first response message and the second response message to determine a third transformation and a fourth transformation, respectively. The third transformation specifies a mapping sufficient to transform one or more response messages from the second software system into one or more corresponding response messages readable by the first software system. Similarly, the fourth transformation specifies a mapping sufficient to transform one or more response messages from the first software system into one or more corresponding response messages readable by the second software system.

The step of generating a test dataset may further include using a test dataset template and test data to generate the test dataset in accordance with one or more modifiable instantiation rules for creating unique test datasets formatted in accordance with the test dataset template. For example, an instantiation rule may specify that each value in a test dataset must be unique. Another rule may specify that values in different test datasets generated from the same test dataset template must differ to enable differentiating test datasets. Another rule may specify that test datasets for each combination of mandatory and optional data items (also called data elements herein) must be created, and so on.

In the specific embodiment, the test dataset includes a fixed portion and a variable portion. The fixed portion includes information describing one or more message schemas. The variable portion includes information describing one or more data elements, including how the data elements are arranged and formatted in accordance with the one or more message schemas.

The specific example method may further include using a message transformation map generator to provide the test dataset to a first driver of the first software system and to a second driver of the second software system, thereby enabling generation of the first set of one or more source messages and the second set of one or more source messages, respectively. The first driver communicates with one or more first native interfaces (e.g., local Application Programming Interfaces (s)) of the first software system. Similarly, the second driver communicates with one or more second native interfaces of the second software system.

The step of triggering may further include employing a first trigger component of the first software system and a second trigger component of the second software system to trigger output of the first set of one or more source messages and the second set of one or more source messages, respectively. The first trigger component may communicate with a first software adapter of the first software system. Similarly, the second trigger component may communicate with a second adapter of the second software system. The first adapter and the second adapter may further communicate with the first native interfaces and second native interfaces of the first and second software system, respectively.

The specific example method may further include, at runtime, establishing communications between the first software system and second software system via an intermediate runtime message mapping system (also simply called a message mapper herein). The message mapper further communicates with the first software system via the first adapter and with the second software system via the second adapter.

The step of receiving may further include collecting all of the first set of one or more source messages and all of the second set of one or more source messages in advance of performing the step of analyzing. Analyzing may further include comparing the first set of one or more source messages and the second set of one or more source messages to determine one or more differences; and using the one or more differences to generate the first transformation and the second transformation, which may account for both schema and data value differences (i.e., differences in values of message data elements).

A mapping characterized by instructions pertaining to the first transformation and the second transformation may be submitted as a group of maps (e.g., for organizational purposes) to a map catalog that is accessible to the message mapper. Note that while the two maps are about the same pair of messages, on for every mapping direction, the two maps are not necessarily combined into one combined map, as either one or the other map may be used at runtime depending on the mapping direction. But they could be stored together with the two message schemas as an organizing principle, called the combined map or map group herein. The message mapper may employ the map group, which may be extracted by the message mapper from the map catalog, to facilitate translating (also called transforming herein), in accordance with the first transformation and the second transformation, one or more messages to be exchanged between the first software system and the second software system.

The specific example method may further include providing one or more User Interface (UI) controls enabling an operator to manually load test data into the first software system and/or second software system, e.g., when the first software system and/or the second software system lack mechanisms to enable automatic loading of the test dataset(s) into the first software system and/or the second software system. Additional UI controls may also be included, e.g., UI controls for enabling an operator to manually specify or adjust one or more data elements of the test dataset; to remove previously loaded test datasets from systems being integrated, and so on.

Accordingly, certain embodiments discussed herein may enable automatic derivation of message maps based on values supplied by the systems being integrated. The values are supplied via messages output by the systems in response to driver-injected test datasets. This may obviate certain conventional manual inspection of message schemas and associated error-prone manual construction of mappings (also called transformations herein) for translating messages between disparate systems that may employ different schemas and message data element values and characteristics (e.g., arrangements, structures, field formats, and so on).

Systematic generation of system messages and constituent data values as discussed herein may not only enable automatic generation of mappings, but may further reduce errors that may otherwise be introduced by manual mapping construction and/or inaccuracies of or lack of sufficient detail available from preexisting schema descriptions.

By deriving mappings and associated rules from actual data values (i.e., data instances contained in message data elements) output from the systems (e.g., via messages responsive to test dataset injection), as opposed to deriving mappings from message schemas alone, more accurate and effective automated mapping generation is enabled.

Accordingly, multiple benefits flow from embodiments discussed herein that use mapping rules based on message instances that are based on a predefined test dataset that is populated into the systems being integrated. Such multiple benefits include, but are not limited to obviating certain manual analysis of message schema, in part by enabling automatic analysis of system outputs responsive to actual and known data, where analysis of the actual and known data can result in more effective and accurate message map construction.

Valuable human time and effort spent defining maps can often be eliminated or significantly reduced, depending upon details of a particular implementation. Enabling automatic derivation of mapping rules may further enable substantial process acceleration, i.e., acceleration of processes used to integrate software systems.

Furthermore, variations of data values can readily be tested in high volume numbers. Furthermore, use of real data instances enable highly accurate mapping rules, as any false assumptions based on available message schema definitions are eliminated.

In addition, various embodiments discussed herein may be implemented without requiring changes to preexisting systems, other than perhaps, driver installation. This can be particularly important for implementations where systems to be integrated cannot be changed, e.g., where system code is inaccessible.

Accordingly, various embodiments discussed herein improve the way systems to be integrated are analyzed to determine how messages output therefrom and received thereby should be translated. By analyzing actual output messages from the systems, the output messages of which are based on one or more predetermined datasets, information pertaining to not only different schemas employed, but different data element characteristics, become readily discernable and usable to create highly accurate message maps.

A further understanding of the nature and the advantages of particular embodiments disclosed herein may be realized by reference of the remaining portions of the specification and the attached drawings.

DETAILED DESCRIPTION OF EMBODIMENTS

Figure 1:
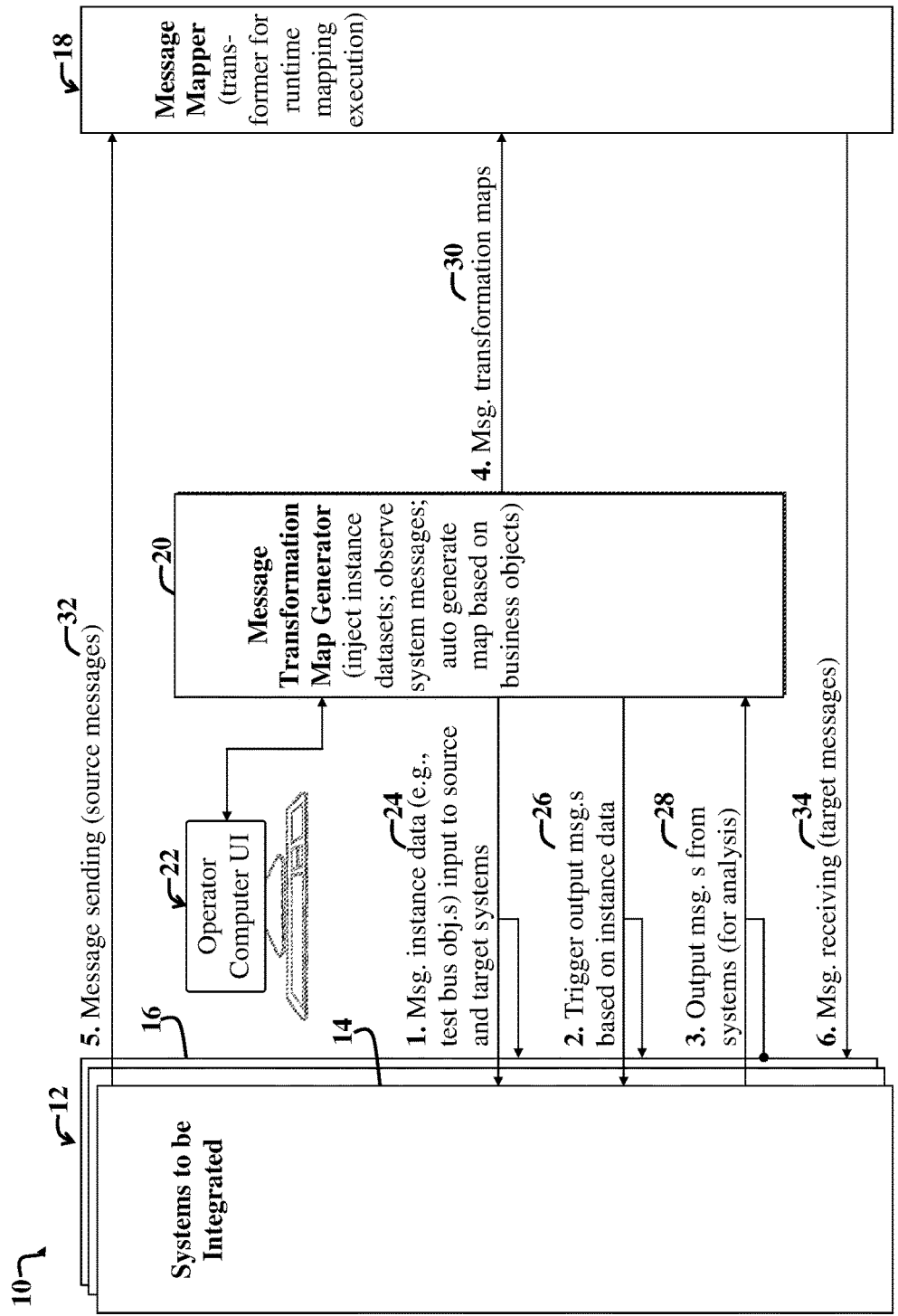
FIG. 1 is a first block diagram illustrating a first example system for generating a message map based on content, called instance data or test data, input to systems to be integrated.

For the purposes of the present discussion, a computing environment may be any collection of computing resources used to perform one or more tasks involving computer processing. A computer may be any processor in communication with a memory. A computing resource may be any component, mechanism, or capability or quantities thereof of a computing environment, including, but not limited to, processors, memories, software applications, user input devices, and output devices, servers, and so on.

A software system may be any collection of computing resources implementing machine-readable instructions, i.e., computer code. Accordingly, the term "software system" may refer to a software application, and depending upon the context in which the term is used, may further refer to the accompanying computer(s) and associated computing resources used to run the software application.

A given software application may include (but not necessarily) constituent software applications or modules (e.g., services, functions, procedures, computing objects, etc.). Accordingly, the term "software application" may also include networked software applications or integrated groups thereof.

Depending upon the context in which the term is used, a software system may further include hardware, firmware, and other computing resources enabling running of the software application. Note that certain software systems may include collections of disparate services, which are implemented in particular sequences in accordance with a process template and accompanying logic. Accordingly, the terms "software system," "system," and "software application" may be employed interchangeably herein to refer to modules or groups of modules or computing resources used for computer processing.

Systems integration may refer to the establishment of communications between systems, e.g., software systems. When software systems to be integrated include enterprise applications, the integration process may be called Enterprise Application Integration (EAI). When the software systems run on a cloud (e.g., a collection of one or more networked server systems), then integration of the software systems may be called Cloud Application Integration (CAI). Note that embodiments discussed herein are not necessarily limited to a particular type of computing environment or types of software systems being integrated.

With bi-directional integration, two or more systems are successfully integrated if a first system can send data to a second system, and vice versa, such that data interpretation is correct by the second system, and vice versa. Accordingly, several systems are successfully integrated if one system is able to send data other systems whenever necessary, in such a way that the data interpretation is correct in every system being integrated, such that no human support or intervention is necessary to actively translate exchanged messages.

Note that embodiments discussed herein are not limited to bi-directional integration. For example, implementations requiring only unidirectional integration are possible. With unidirectional integration, the first system can send messages that are accurately interpreted and processed by the second system without requiring human intervention or participation in message interception and configuration, where the first system need not accurately receive and interpret messages from the second system.

For the purposes of the present discussion, an enterprise computing environment may be any collection of computing resources of an organization used to perform one or more tasks involving computer processing. An example enterprise computing environment includes various computing resources distributed across a network and may further include private and shared content on Intranet Web servers, databases, files on local hard discs or file servers, email systems, document management systems, portals, and so on.

Enterprise software may be any set of computer code that is adapted to facilitate implementing any enterprise-related process or operation, such as managing enterprise resources, managing customer relations, and so on. Example enterprise resources include Human Resources (HR) (e.g., enterprise personnel), financial resources, assets, employees, business contacts, sales data, and so on, of an enterprise. Examples of enterprise software include Enterprise Resource Planning (ERP) software for facilitating managing enterprise activities (e.g., product planning, inventory management, marketing, sales, and so on). Example ERP applications include Customer Relationship Management (CRM), Human Capital Management (HCM), Business Intelligence (BI), enterprise asset management, enterprise asset management, corporate performance and governance applications, and so on.

The terms "enterprise software system" and "enterprise application" may be employed interchangeably herein. However, an enterprise application may include one or more enterprise software modules or components, such as UI software modules or components. The term "enterprise software system" may further include hardware, firmware, and other computing resources enabling running of the enterprise software.

A networked computing environment may be any computing environment that includes intercommunicating computers, i.e., a computer network. Similarly, a networked software application may be computer code that is adapted to facilitate communicating with or otherwise using one or more computing resources, e.g., servers, via a network.

A networked software application may be any software application or computer code that uses data and/or functionality provided via one or more resources, e.g., data, memory, software functionality, etc., that are accessible to the software application via a network.

Communications between integrated software systems may include synchronous and/or asynchronous messaging. With synchronous messaging, the timing of message sending or receiving affects whether a software process proceeds or pauses, e.g., to wait for a response to a sent message. Systems employing direct synchronous communication often call each other remotely, e.g., using REST (REpresentational State Transfer)-based interaction.

With asynchronous messaging, the systems need not be running concurrently, and the different systems need not rely upon responsive messages before proceeding with other processing. Systems employing asynchronous communications often leverage separate message transmission systems or message brokers, buffers, caches, and so on, e.g., to enable other systems to subscribe to message feeds, etc.

For both synchronous and asynchronous integrations, data structures conveyed via messages often conform to underlying data models, which can be different between different systems.

For the purposes of the present discussion, a data model may be any definition of a structure or format characterizing an organization of data. The data may be organized in data objects, where certain relationships may occur between the data objects and/or elements of the data objects. These relationships may be considered part of the data model.

A data model may further include a description of the objects, where the description specifies a collection of concepts and/or rules used to define the structure of the data model. For example, a certain data model may employ relations and tuples between database records and fields. Data models are often represented graphically, e.g., using data modeling notation. A message schema used by a system may represent a subset of the data model.

Accordingly, a data model may define how data is organized, in addition to data types and interrelationships between data types and instances of data of the data types. In some context, a data model may describe not just data structure definitions and associated data organization, but the actual data that is included in the data structures and organized in accordance with the data model specifications or definitions.

Note that in the present example embodiment, messages exchanged between systems may include or represent data that is structured based on objects, e.g., business objects. Different business objects from different systems may reflect different data models used by the different systems and may include data that is structured in accordance with the data model specification.

Furthermore, note that a message schema describing structures and data elements of content exchanged between resources, e.g., software systems, in a computing environment, may represent a subset of a data model used by a source system that transmits a message. Recall that a schema may dictate, for example, message content formatting or grammar, where the grammar may include rules for specifying content structures, data types, and so on. The term "message format" as used herein may include message schema, data element characteristics, arrangements, relationships, encodings, and so on, which describe properties of mechanisms (e.g., language) used to convey information encapsulated by a message.

An object, such as a data object, may be any grouping of or encapsulation of data and/or functionality. Examples of objects include classes or structures implemented via object-oriented programming languages; tables, rows, or records of a database; and so on.

A business object may be any object used to organize information for business purposes. The terms "object," "data object," "computing object," and "business object" may sometimes be employed interchangeably herein. A data object may represent a particular type of computing object, where the object represents a collection of data and need not include functionality or methods embedded in the object.

Note that different software systems may use different data models to store data and different schemas to organize and package data into messages for sending to other systems. Systems that employ symmetric schemas are configured to receive messages that conform to the same schema used by the system to transmit messages.

Note that even when similar schemas are employed by different systems to be integrated, message data values encoded in accordance with the schema may differ. Accordingly, schema equality does not necessarily imply data value equality. For example, one message payload may represent a string, while another corresponding payload from another system might represent an integer.

Messages can be one-way messages and/or part of a protocol that includes several messages being exchanged between systems, all part of a single conversation (communication session) to be completed. Messages of a conversation and message order may be defined in a message exchange protocol with which the integrated systems comply to effectuate intercommunications therebetween.

A message may represent a transmitted data object that includes data and may further include any control information, e.g., addresses, error codes (in case a protocol or system error needs to be communicated), originating system version information, and so on. The control information can be incorporated into a message header. If a message is lost during a transmission, the protocol may leverage a predefined method for detecting such; determining if loss of the message is relevant or significant for the communication session, and so on.

Message control information, as may be included in a message header, may accompany message payload data.

Message payload data my include sets of complex data structures, e.g., complex objects, and corresponding data values, where the complex data structures are incorporated into one or more corresponding messages.

Integrated systems may leverage message maps to ensure that a message sent from a first system, called the source system, can be properly received an interpreted by a second system, called the receiving system or target system. Message maps can include data value and/or schema transformations or no transformations (e.g., when the same schema and data values are used by both systems). Note that the term "transformation" as used herein represents a mapping between content of the same encoding (e.g., both messages are eXtensible Markup Language (XML) messages). The term "translation" primarily refers to mappings that account for different message encodings, e.g., from XML to JSON (JavaScript Object Notation). Transformation can be applied after translation. Note that while both translation and transformation can be done using one map, that separating translation and transformation into different maps can be preferable in certain implementations. In general, the term "mapping" may refer to a process of adjusting messages of a source system so that they are receivable and readable by a target system. Accordingly, a transformations and translations can represent types of mappings.

Each data element of a message that is sent from an integrated system may be transformed into one or more data elements through individual mappings. Execution of the mappings of a map is called message transformation and/or translation, and yields a message (called a target message herein) to be sent to a receiving system.

When a first system sends a message to a second system, the first system is called the initiating system, source system, or sending system, and the second system is called the target system or receiving system.

Note that sending or receiving roles of the first and second systems can change. Messages can include computing objects with complex data structures and corresponding data values, which may be included in corresponding fields or elements of a message. A message can be encoded via a programming language data message representation in binary format; and/or represented as structured data that includes American Standard Code for Information Interchange (ASCII) characters following JavaScript Object Notation (JSON) grammar rules; and/or via other encoding mechanism(s).

In an example enterprise computing environment, a Human Resources (HR) system may be integrated with a Financials system, which may employ different data models and associated schemas, which represent subsets of the data models. Note that, for example, if an HR system must forward person data to a Financials system, then only the person data is typically communicated in the message(s), i.e., not the complete data model.

Generally, each system to be integrated may define its own message schema, whereby schemas of messages are different even if they represent the same dataset (i.e., collections of one or more objects), e.g., a set of data pertaining to a person. Schema mismatches can be resolved by a transformation from the message schema of the sending system to the message schema of the receiving system.

Note that various embodiments discussed herein can perform schema transformation, value transformation, or neither or both. Value transformation may involve translating individual data values corresponding to message data elements, which may represent similar data, but may require additional adjustments that are not necessarily specified via schema definitions. For example, a value of "CA" may be translated into a value of "California" in certain implementations.

Accordingly, data values and schemas may differ, such that a reliable transformation will also map data values (e.g., corresponding to data elements of an object being sent via the message(s)); not just schemas, and account for any differing data values and associated data element characteristics (e.g., a data element specifying the state in which a person resides as "CA" on one system may be specified as "California" in another system).

In a special case where a set of message schemas and data element characteristics comprising schemas and data element characteristics of a source system and a target system are the same, i.e., they already match, then no message schema transformation and/or transformation of data element characteristics is necessarily required. If data value representations are also the same, then the transformation is reduced to the copy function. Such special cases are also supported by various embodiments discussed herein.

Note that a collection of one or more transformations or translations (also called mappings herein) may be defined by a message map (also simply called map herein). The map may account for schema changes (e.g., splitting a name into a first and last name) as well as data value changes (e.g., converting CA into California). Generally, message transformations or translations discussed herein may account for variations of interpretations of content.

For clarity, certain well-known components, such as hard drives, processors, operating systems, power supplies, routers, Internet Service Providers (ISPs), workflow orchestrators, process schedulers, Tenant Automation Systems (TASs), certain web services, virtual machines, middleware, enterprise databases, and so on, are not necessarily explicitly called out in the figures. However, those skilled in the art with access to the present teachings will know which components to implement and how to implement them to meet the needs of a given implementation.

FIG. 1 is a first block diagram illustrating a first example system 10 and accompanying computing environment, which is configured to enable generation of a message map based on message instance data (also called test data herein) that is input to software systems 12 to be integrated.

In the present example embodiment, message instances and injected test datasets conform to a message schema and contain instance data, also called message payload data. Message instances are encoded using formal data structures, e.g., JSON (JavaScript Object Notation) or eXtensible Markup Language (XML) objects. Other encodings are possible.

In the present discussion, it is assumed that the encodings are known and that a message instance can be interpreted. If an unknown encoding is encountered, it is assumed that the encoding can be translated into a known encoding. This assumption is valid since message instances use sentences of a formal grammar, and as a consequence, this can be described and interpreted.

Test datasets discussed herein may contain an instance of a business object, such as an address. Each mandatory element of the business object will contain a value. Optional data elements (which may be called fields herein) may or may not contain a value. Note that mandatory data elements may also be called fields. A maximum number of test datasets created may be based on the number of the unique combinations of value variations (e.g., optional, mandatory, etc.). Note however, that actual the number of datasets generated may vary depending upon the needs of a given implementation and need not be the maximum number. An additional criterion for the maximum number of test datasets to be created can be based on the upper limit of data object sizes, i.e., the number of data elements in a data object. Additional or different criteria are possible depending upon the particular test dataset template at hand.

The example overall system 10 includes a message transformation map generator 20 in communication with the systems 12 to be integrated and a message mapper 18. An operator computer system 22 and accompanying User Interface (UI) provides user options for configuring the message map transformation generator 20 (also simply called a map generator herein), including options (e.g., as may be provided via UI controls) to selectively adjust test datasets; options to manually enter data into systems in certain scenarios, e.g., when one or more software systems to be integrated lack mechanisms enabling automatic input of test datasets, and so on, as discussed more fully below with reference to FIG. 8.

With reference to FIG. 1, the systems 12 (including systems 14 and 16) to be integrated may include two or more software systems, including a first system 14 and a second system 16. When content is transferred from the first system 14 to the second system 16 via one or more messages, e.g., as may be delivered over a network, the first system 14 is called the source system or sending system, and the second system 16 is called the target system or receiving system. Similarly, when the second system 16 sends a message to the first system 14, the second system 16 acts as the source system, while the first system acts as the target system.

Figure 2:
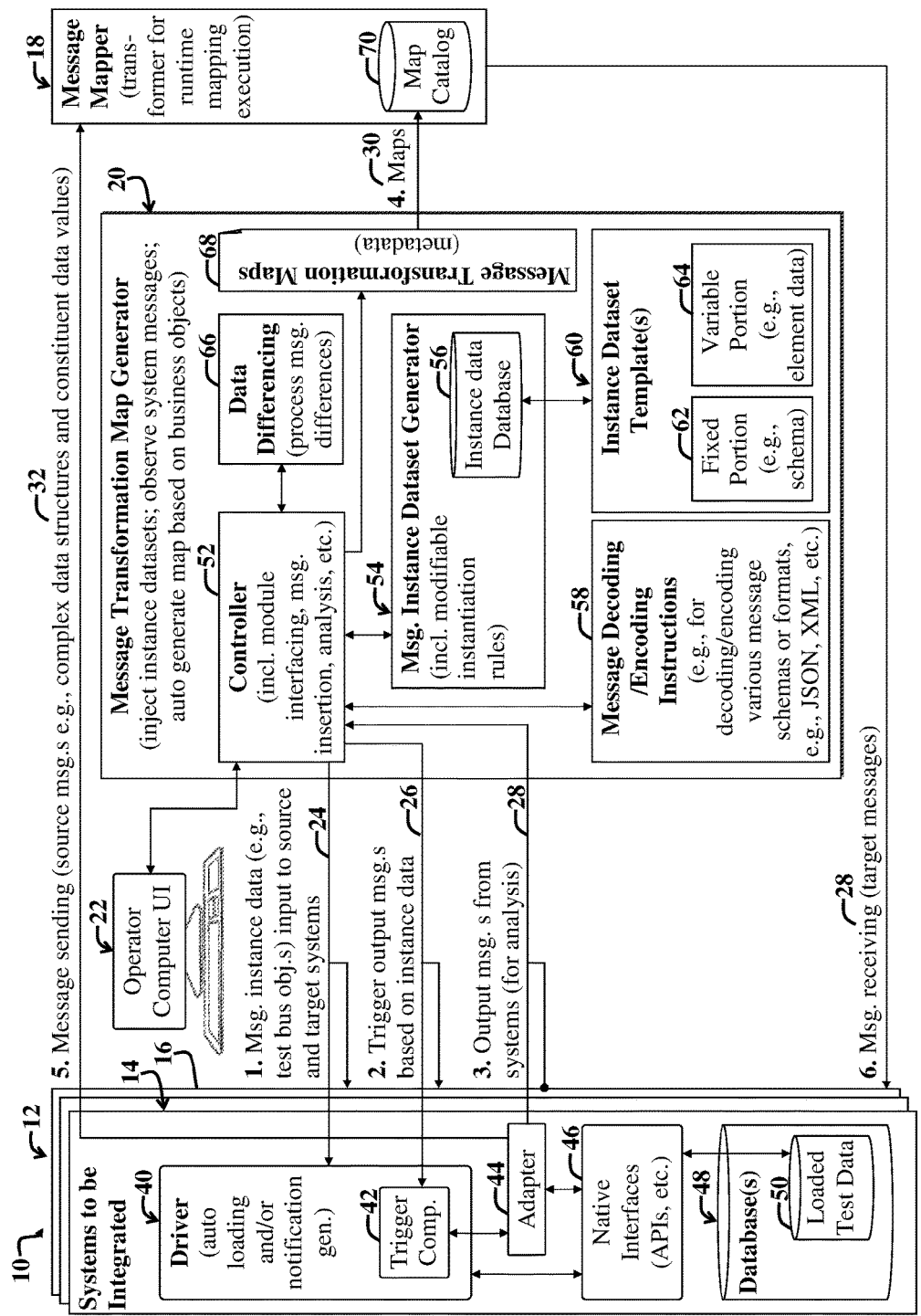
FIG. 2 is second block diagram illustrating more detail of the first example system of FIG. 1.

With reference to FIGS. 1 and 2, note that the systems 12 to be integrated may include an arbitrary number of software systems or disparate applications or computing resources that are to be coupled for intercommunications via the message mapper 18, which translates messages therebetween in accordance with one or more message maps.

While various embodiments discussed herein more specifically discuss integration between two systems, note that integration between various combinations of systems is possible. For example, the first system 14 (FIG. 3) may be integrated with several other systems, e.g., in a one-to-many and many-to-one integration, which may be bi-directional or unidirectional, depending upon the needs of a given implementation. Accordingly, many software systems may be integrated with a single software system and vice versa, where the many software systems need not necessarily be integrated directly with each other. Furthermore, with reference to FIG. 1, it is possible, using embodiments discussed herein to fully integrate all of the software systems 12, such that each of the software systems can intercommunicate, e.g., via the message mapper 18 and any associated network, such as the Internet.

With reference to FIG. 1, the message transformation map generator 20 includes computer code for facilitating automatic generation of message maps used by the message mapper 18. The message maps include instructions specifying how to transform or otherwise map messages originating from one system (e.g., the first system 14) into a format that is readable by another system (e.g., the second system 16), the systems of which may employ different data models and different message schemas describing how messages are built from the data models and packaged, encoded, or otherwise formatted for sending to other systems, e.g., via a network, such as the Internet.

The message mapper 18 includes computer code for selectively accessing message maps (e.g., from a map catalog) generated by the message transformation map generator 20, and then applying the maps to thereby translate messages sent between the software systems 12. When a source message is transformed into a target message for delivery to a target system, the source message is said to be mapped in accordance with a message map, also called a transformation map or simply map herein. Accordingly, a map may include a set of mappings or rules that specify, for each data value of a source message, how the data value is represented in the target message.

The overall system 10 may represent a networked computing environment, such as a networked enterprise computing environment. Note that in general, groupings of various modules of the system 10 are illustrative and may vary, e.g., certain modules may be combined with other modules or implemented inside of other modules, or the modules may otherwise be distributed differently (than shown) among a network or within one or more computing devices or virtual machines, without departing from the scope of the present teachings.

For example, the message mapper module 18 may be included within the message transformation map generator 20, which may run on a single server or server system, without departing from the scope of the present teachings.

Note that in certain implementations, the message transformation map generator 20 and associated message mapper 18 may be accessible to authorized operators via the Internet, e.g., via a browser running on the operator computer 22, which is connected to the network. Furthermore, note that the various modules of the overall system 10 need not be coupled to a network, but instead may run on a single computer system, without departing from the scope of the present teachings.

To construct a message map, the message transformation map generator 20 inputs one or more test datasets to the systems 12 to be integrated. The test datasets contain message instance data (i.e., test data) that is encoded and formatted in accordance with one or more dataset templates, which in turn are constructed in accordance with a set of one or more instantiation rules, as discussed more fully below. Note that for the purposes of the present discussion, test data may be any data that is input to or otherwise injected into a software system for the purposes of analysis of outputs provided by the software system based on the inputs.

Test datasets input by the message transformation map generator 20 to the systems 12 to be integrated are said to be injected into the systems to be integrated. For the purposes of the present discussion, a dataset is injected into a system if a driver running on the software system (or otherwise in association therewith) is used to populate one or more databases of the systems 12 to be integrated with the data of the dataset that is being injected into the systems 12.

Note that drivers installed on or in association with the systems 12 may be custom drivers that are designed to receive test datasets supplied by the map generator 20 and to populate one or more databases of the systems 12 to be integrated. Those skilled in the art with access to the present teachings may readily develop and install drivers to perform such functions to meet the needs of a given implementation without undue experimentation.

For the purposes of the present discussion, a driver may be any mechanism that provides a software interface to a system, wherein the software interface includes a mechanism for enabling input or injection of data into the system, and wherein the mechanism for inputting data into the system may use message formats that need not comply with message schemas used by the system to communicate with other systems via an adapter.

A driver may leverage native interfaces of the system, e.g., Application Programming Interfaces (APIs), middleware, services, and/or other mechanisms incorporated into the system. In certain implementations, the driver may be a custom driver that is installed on one or more computers used to run the software system, where the driver has been customized to receive test datasets from the message transformation map generator 20 and then to populate one or more databases of the software system with data provided via the test dataset, which is said to be injected into the system thereby.

Accordingly, a driver may act as a computing resource that interfaces one or more modular components of a software system or systems, where the interfacing enables delivery of control signals and/or data to the one or more modular components. The control signals may direct the software system to populate databases with data provided to the driver.

For the purposes of the present discussion, an adapter of a software system may be any software component or interface for converting or formatting data to be transmitted via one or more messages, e.g., in accordance with a predetermined message schema, and/or for converting or formatting data to be received via one or more messages, which exhibit the message schema. Generally, adapters discussed herein include resource adapters, which can receive, send, and/or otherwise route data that is encoded or otherwise packaged into messages in accordance with a message schema. An adapter may convert data to be transmitted from one presentation form to another, e.g., the data presentation can represent a message sent as packets over a network or otherwise transferred between computing objects of one or more software applications or systems.

Accordingly, a driver, as discussed herein, may represent a type of specialized adapter, which is specialized to receive test datasets, i.e., instance datasets, from the message transformation map generator 20.

In the present example embodiment, it is assumed that each of the systems 12 being integrated can interpret the message encoding of messages from the other systems 12. Otherwise, a translation of message encodings into each other is assumed possible. Furthermore, it is assumed that messages can be sent simultaneously between systems 12. In addition, it is assumed that the systems 12 employ synchronous communications.

Nevertheless, embodiments are not limited to integration of synchronous systems, but may be configured to work with asynchronous systems that may employ one or more message brokers positioned between the systems and between a message mapper, e.g., the message mapper 18. In such alternative embodiments, the map generator 20 may communicate synchronously with drivers of the systems 12 so as to inject test datasets. In addition, the map generator 20 may communicate with message brokers or buffers containing outputs of the systems 12 to retrieve triggered output messages from the systems (where the triggered output messages are based on injected test datasets), which are then analyzed so as to generate message maps employed by the message mapper 18. Then, during runtime (i.e., when communications are to be exchanged between systems 12), message mapper 18 may then selectively retrieve and translate messages pulled from message buffers in preparation for delivery to one or more target systems.

In an example scenario, the message transformation map generator 20 (also simply called map generator 20 herein) facilitates integrating the first system 14 with the second system 16 of the systems 12 to be integrated. The map generator 20 generates one or more initial datasets in accordance with a dataset template and associated test dataset instantiation rules, as discussed more fully below.

The resulting test dataset 24 is injected (1.) into the first system 14 and second system 16 via drivers thereof. The map generator 20 then activates trigger components of the systems 14, 16, via issuance of a trigger signal 26 to the trigger components (2.), thereby triggering issuance of source messages 28 that are output by the systems 14, 16 and received by the map generator 20 (3.).

Note that the exact same test dataset 24 may be loaded into the systems 12, including the first system 14 and the second system 16, e.g., so that so that the equivalence of the information in both systems is assured. In the present example embodiment, the test dataset contains an instance of a business object, e.g., person information, address, or other object. Each mandatory data element will contain a value and optional fields, which may or may not contain a value. Test data for use in the test datasets 24 may be chosen so that the resulting messages 28 can be distinguished from other messages generated in response to other test datasets. Furthermore, every test dataset may have a unique identifier. The unique identifier may be included in a data element or field, e.g., extra characters may be added after a name, e.g., John123 so as to create the identifier.

The map generator 20 includes computer code for processing the received source messages 28 and determining differences in message schemas and data element characteristics between messages of each system 12 being integrated. The observed differences are analyzed to thereby automatically generate mappings that enable conversion (e.g., transformation or translation) of the source messages 28 into target messages readable by receiving systems 16, 14. For the purposes of the present discussion, a target message is said to be readable by a receiving system if the target message is encoded, structured, or otherwise formatted according to a schema (and associated rules and grammar) used by adapters of the receiving systems.

In the present example scenario, after initial map creation by the map generator 20, the resulting map(s) 30 is made available to the message mapper 18. The message mapper 18 may then employ the map to, for example, translate source messages 32 (5.) output by the source system 14 into target messages 34 (6.) readable by the receiving system 16.

Similarly, if the second system 16 sends a source message destined for the first system 14, the second system 16 is called the source system, and the first system 14 is called the receiving system or target system. In this case, messages sent from the second system 16 are translated by the message mapper 18 according to the message map and then forwarded as target messages to the first system 14.

Note that the above scenario is merely an example. In other scenarios, a message map may include further instructions to map return messages, error messages, and/or other types of messages, which may employ different message data structures, schemas, data element characteristics, and so on, than a given source message. Whether a given message represents a source message, return message, error message, or other message type, may be determined by the message mapper 18 with reference to message header information, which may specify message type and message address information (e.g., source and destination addresses). Alternatively, or in addition, message type can be inferred via analysis of message payload characteristics. Yet another approach involves following the protocol. For example, a regular message might cause a return message. Accordingly, without introspecting the message, it is possible to know that a message is a return message. Similarly, for an error message, if an erroneous message is sent, then an error message is returned. An erroneous message may be any message that violates the generation rules. Hence, it is possible to know that the return message is an error message.

The message header information may include metadata describing message type, message destination, and so on, which is usable by the message mapper 18 to activate appropriate rule sets of a given message map so as to effectuate proper message translation in accordance with the message type. Accordingly, a given message map may include sub-mappings for different types of messages to be exchanged between systems 12 being integrated.

In addition, system version information may also be included in message header metadata. The map generator 20 and/or message mapper 18 may use the system version information to determine when a new map should be generated to facilitate system integration. This can be useful when one of the systems 12 is upgraded to a system that employs a different schema and/or data element characteristics as compared to an earlier version for which a map currently exists in a map catalog used by the message mapper 18.

FIG. 2 is second block diagram illustrating more detail of the first example system 10 of FIG. 1. In particular, the first system 14 is shown as including a software driver 40, which includes computer code for enabling injection of test datasets 24 (1.) from the map generator 20 into the first system 14, and for automatically loading data from the test dataset into one or more databases 48, resulting in loaded test data 50, and/or for generating notifications to be sent to the map generator 20. Note that while in the example embodiment of FIG. 2, the driver 40, trigger component 42, and adapter 44 appear within the boundaries of systems 12 being integrated, that in practice, the modules 40-42 may be considered to be outside of the systems 12 being integrated, such that they are external to the systems 12.

The driver 40 further includes a trigger component 42, which includes computer code for leveraging native interfaces 46 and/or a communications adapter 44 to selectively trigger output of messages 28 (3.) from the first software system 14 in response to a trigger signal 26 (2.) from the map generator 20. The output messages 28 incorporate the injected and loaded test data 50 in accordance with a schema and data model used by the first system 14.

Note that the adapter 44 (and other similar adapters of the systems 12) may provide an abstraction to simplify access to systems for message processing. Example abstractions include abstractions for extracting a message from a system and subscribing to messages from the system. Adapters discussed herein may be actively invoked (e.g., by the map generator 20) to obtain a message. Adapters may also proactively notify subscribers when a message becomes available. The subscriber (e.g., the map generator 20 and message mapper 18) may then extract the message or notification about the message. The notification may include the message itself.

Note that while the trigger component 42 is shown as part of the driver 40 and in communication with the adapter 44, that other groupings are possible. For example, the trigger component 42 need not be incorporated into the same driver 40 used for test dataset injection, but may be implemented as a separate software component, without departing from the scope of the present teachings.

Note that modules that are similar to the example modules 40-50 used for the first system 14 may be used for each of the systems 12 to be integrated, including the second system 16.

The example map generator 20 is shown including a controller 52 in communication with a data differencing module 66, a message instance dataset generator 54 (also called test dataset generator), and a set of message decoding and encoding instructions 58. For the purposes of the present discussion, data differencing functionality, e.g., as may be implemented via the data differencing module 66, may be any software functionality for comparing data and then performing an action based on the results of the comparisons and differences between or among the data as determined during the comparisons.

In the present example embodiment, the controller 52 of the map generator 20 includes computer code for interfacing various modules 52-64 of the map generator 20; for generating message transformation maps 68 based on message format differences (i.e., differences in message schemas, data element characteristics, and so on, including data types, data structures, and so on) as output by the data differencing module 66 based on outputs from a data differencing module 66, and so on, as discussed more fully below. The message transformation maps 68 output by the map generator 20 may be delivered to a map catalog 70, e.g., via a map signal 30, accessible to the message mapper 18.

Note that message transformations are defined by the map(s) 30, wherein the transformations may include schema changes (e.g., splitting a name into a first and last name) as well as data value changes (e.g., converting CA into California). In general, the transformations account for variations in interpretations of message content.

Furthermore, note that while in the present example embodiment, the map catalog 70 is shown as included within the message mapper 18, that embodiments are not limited thereto. For example, the map catalog 70 may be included within a different module, e.g., the map generator 20 or separate database, without departing from the scope of the present teachings.

The driver 40 communicates with native interfaces 46, which may include one or more APIs and/or other interfaces that are suitable to facilitate use of the driver 40 by the map generator 20 to inject data into one or more databases 48 of the first system 14.

The adapter 44 includes computer code for encoding and decoding messages sent to/from other systems (e.g., the system 16) via the intermediate message mapper 18, which may act as a message translator that may selectively execute mappings of the map catalog 70 at runtime, so as to translate messages sent between the systems 12 in accordance with associated mappings maintained in the map catalog 70.

The example controller 52 of the map generator 22 includes additional computer code for facilitating sending test datasets (e.g., comprising message instance data, also called test data herein) to the driver 40 for injection into the system 14 (and to a driver of the second system 16 for injection thereto), and for facilitating delivery of the trigger signal 26 to the trigger component 42, so as to trigger the first system 14 (and to a trigger component of the second system 16) to output messages 28 incorporating the loaded test data 50.

Once the output messages 28 incorporating the injected test datasets 24 are sent to the map generator 20, the controller 52 performs any requisite message decoding and/or encoding in accordance with the message decoding/encoding instructions 58. The message decoding/encoding instructions may include instructions for encoding and/or decoding various message types and associated schemas or formats, e.g., messages representing JSON (JavaScript Object Notation), eXtensible Markup Language (XML), or other formats and associated message encodings and schemas.

In an example scenario, decoded output messages 28 from the first system 14 and the second system 16 are forwarded by the controller 52 to the data differencing module 66. The data differencing module 66 includes computer code for determining differences in the output messages 28, which are based on the same injected test dataset 24, which has been injected to both systems 14, 16.

The resulting identified differences are forwarded from the data differencing module 66 to the controller 52, which includes code for processing the differences and generating message transformation maps 68. The message transformation maps, i.e., message maps (which may represent metadata) 68 are then stored in the map catalog 70.

Note that to generate the initial test dataset(s) 24 sent to the first system 14, the controller 52 activates the message instance dataset generator 54 (also called the test dataset generator 54). The message instance dataset generator 54 includes modifiable (e.g., as may be modifiable via a user of the operator computer 22) dataset instantiation rules for generating test datasets in accordance with one or more instance dataset template(s) 60 (also called instance dataset template(s)), as discussed more fully below.

A test dataset template 60 can be populated repeatedly with different data values. One template may be used the dataset generator 54 and controller 52 to generate a list of many test datasets. Instantiation rules prescribe how the data values are created for each of the test datasets.

In the present example embodiment, the message instance dataset generator 56 has access to a set of instance data, i.e., test data, as maintained via an instance data database 56 (also called a test data database 56). The instance data database 56 may include data used to populate test datasets 24 that are injected into the systems 12 being integrated, e.g., via system drivers (such as the example driver 40). The instance data database 56 may further include actual datasets that have been constructed in accordance with instance dataset templates 60 and associated instantiation rules of the dataset generator 54.

Test datasets stored in the instance data database 56 are accessible to the controller 52. The controller 52 may package the test datasets for injection into the systems 14, 16 via one or more drivers 40.

In the present example embodiment, the instance dataset templates 60 each include a fixed portion 62 and a variable portion 64. The fixed portion 62 may represent a particular schema employed for the test dataset. The variable portion 64 may include message data element characteristics, including data to be incorporated into one or more test datasets 24 to be injected into the systems 12 being integrated.

In an example scenario, the controller 52 employs the message instance dataset generator 54 to generate test datasets 24 for injection into the systems 12 to be integrated, where the test datasets 24 are based on the instance dataset templates 60, which are populated with instance data from the instance data database 56 in accordance with instantiation rules.

After injection of the test datasets into two or more of the systems 12 to be integrated, e.g., as may be injected via one or more drivers 40, then the controller 52 activates two or more trigger components 42 to trigger the systems 12 to output messages 28 based on the loaded test data 50 pertaining to the injected test datasets 24.

The resulting output messages 28 are then analyzed and compared, e.g., in part using the data differencing module 66, thereby enabling automating generation of one or more message transformation maps 68. The one or more message transformation maps 68 are stored in the map catalog 70 for access by the message mapper 18 as needed. The message mapper 18 then employs the maps of the map catalog 70 to translate messages sent between systems 12 for which maps have been generated (e.g., generated using injection of test datasets and analysis of resulting output messages 28).

Accordingly, the map catalog 70 can be used for transforming message instances in actual systems integration execution. During map execution, messages, e.g., source messages, become available via system adapters (e.g., the adapter 44). The message mapper 18 retrieves maps from the map catalog 70 that that map messages between source and target systems, such that mappings are used to create target messages from corresponding source messages. The target message is then passed to the target system.

In general, note that the overall system 10 implements four primary phases, including a first message map creation phase, a return message map creation phase, an error map creation phase, and a transformation execution phase.

In situations where the systems 12 to be integrated lack mechanisms, e.g., native interfaces 46 and suitable drivers 40 for enabling automatic test dataset injection, then manual injection of test datasets is possible. In such cases, a user, e.g., operator of the operator computer 22, may navigate UI display screens of operator software, and then manipulate one or more UI controls to enable manual entry of test datasets into the databases (e.g., the database 48) of the systems 12 to be integrated.

Furthermore, the operator computer 22 and accompanying UI display screens may include UI controls to enable user specification of certain settings of the map generator 20, e.g., settings that may define how test datasets are built using the dataset templates 60. Additional UI controls my enable operators to make any adjustments to data elements of test datasets; message mapping rules, and so on, as discussed more fully below with reference to FIG. 8.

Figure 4:
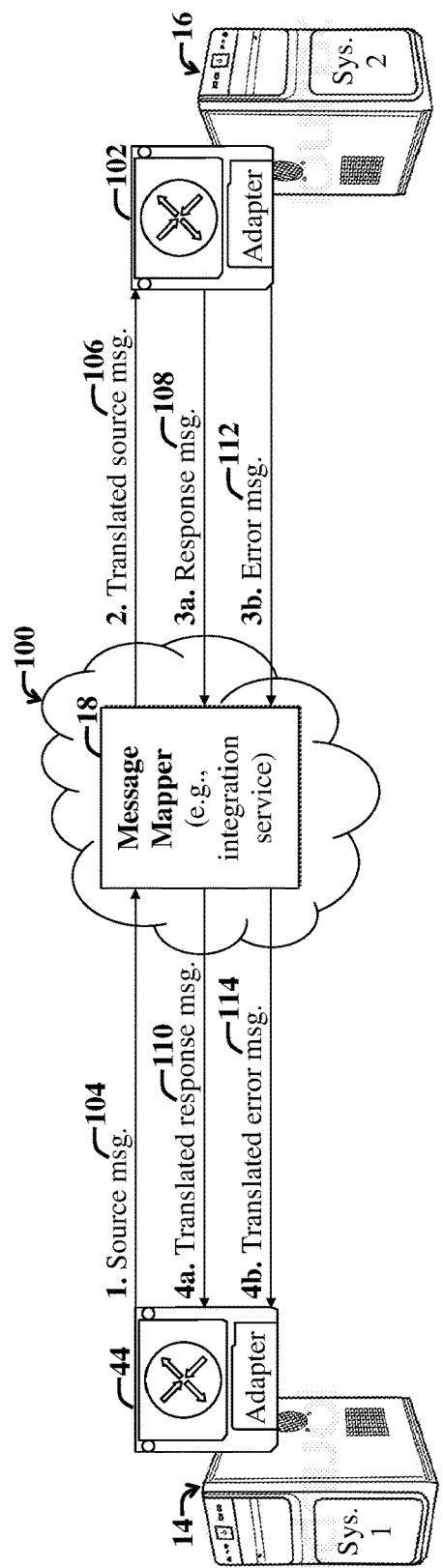
FIG. 4 is a simplified fourth block diagram illustrating the two example systems of FIG. 3 involved in a sequence of exchanged messages via the intermediate message transformer of FIGS. 1-3.

In summary, after the map generator 20 has triggered the systems 14, 16 to create messages corresponding to the test datasets, the map generator 20 then starts receiving the messages from the adapters 44 (including adapter 102 of FIG. 4). Since the map generator 20 knows the original test dataset, it can determine which part of each of the messages contain which data value from the original test dataset. If both messages are analyzed, the map generator 20 can determine the correlating data values in both messages and how to transform one message into the other.

The analysis (including output from the data differencing module 66) is used by the map generator 20 to create a set of mappings that together will form the map used by the message mapper 18 to translate initial messages sent between the first system 14 and the second system 16.

Note that the map generator 20 can cause error messages to be output by the systems 14, 16, e.g., by sending intentionally incorrect messages. Once the error messages are received by the map generator 20, a map can be created therefrom, which may then be stored in the map catalog 70.

In general, for initial messages, return messages, and error messages, mappings are created for both directions (e.g., to and from the first system 14 and the second system 16). The mapping for each direction may be stored as a separate map in the map catalog 70. In certain implementations, each map has mappings, e.g., a list of mappings. The mappings may be organized by the element structure in the message type. The map and accompanying mappings be implemented via one or more look-up tables or other known mechanisms.

Note that due in part to the ability of the map generator 20 to correlate messages, the order of the messages as they are sent by the systems 14, 16 is not necessarily relevant for the map generator 20. The same is true in implementations where a system sends messages in batches instead of individually one-by-one.

Once a map is retrieved by the message mapper 18, e.g., from the map catalog 70, its mappings are used to create a target message 28 from a source message 32. The target message 28 is then sent to the target system 16.

Accordingly, the approach to system integration employed by the present example embodiment illustrated by the overall system 10 differs from conventional approaches which rely primarily upon schema definitions to facilitate system integration. The present example embodiment provides a specific implementation of a solution to a problem, namely, the problem of inaccuracies resulting from relying solely upon schema definitions and associated metadata to determine maps or transformations for translating messages to be exchanged between systems. Embodiments discussed herein may further account for differences in data element characteristics that are not necessarily evident from analysis of conventional schema definitions. Furthermore, the present example embodiment facilitates automatic integration and may obviate substantial manual work that may otherwise be required when integrating systems using conventional approaches.

Recall that conventional approaches to system integration and associated message-map development often rely upon schema definitions, which represent a type of metadata used to format messages. However, the schema definitions may lack sufficient detail to ensure accuracy during message translation. Data element characteristics, e.g., whether a name is split into a first name and a last name or incorporated into a single field; whether address information specifying a state is abbreviated or not; and so on, may not be precisely defined by the schema definitions.

Figure 3:
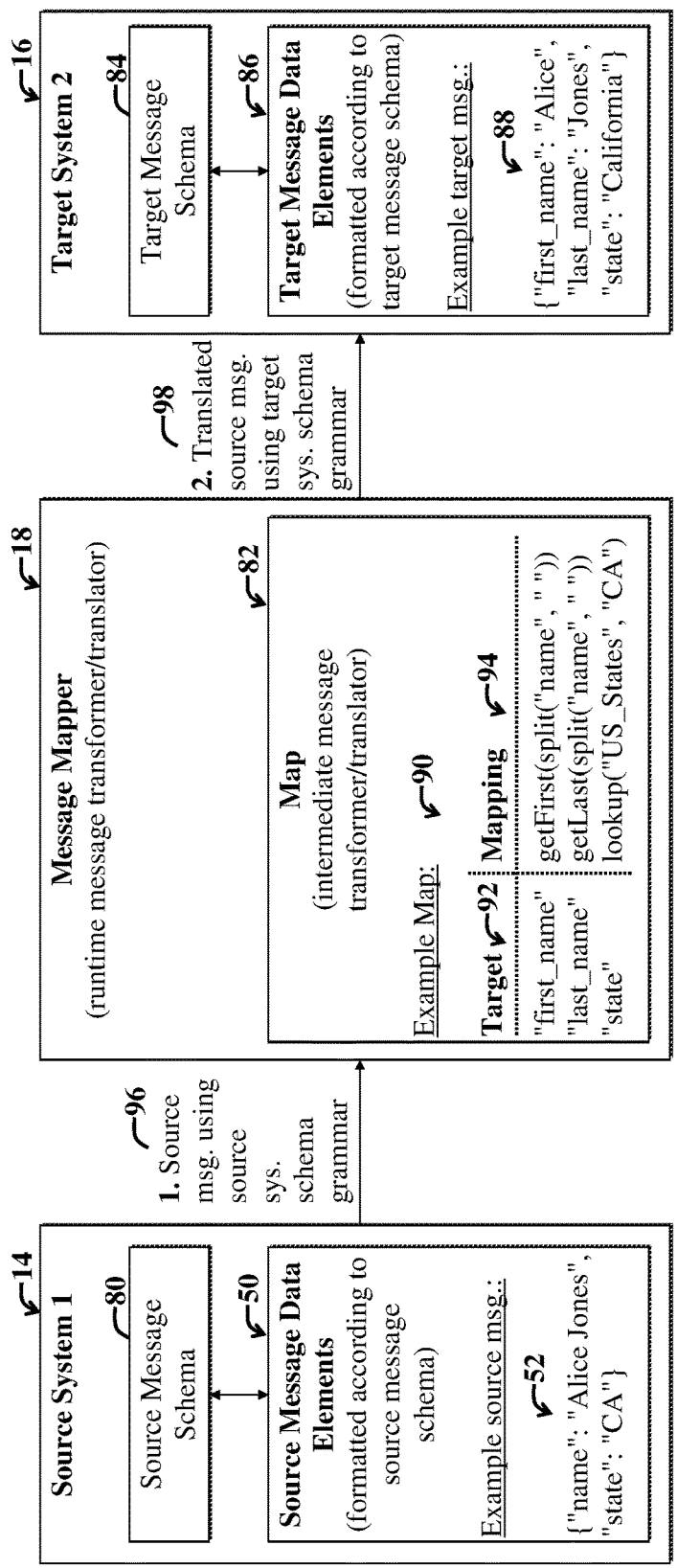
FIG. 3 is a simplified third block diagram illustrating two example systems involved in a first example communication comprising a message sent from a source system to a target system via an intermediate message transformer (also simply called a message mapper), wherein a message map employed by the intermediate message transformer may be constructed by the message transformation map generator (also simply called a message map generator) of FIGS. 1 and 2.

FIG. 3 is a simplified third block diagram illustrating the two example systems 14, 16 involved in a first example communication comprising a message 96 sent from a source system 14 to a target system 16 via the intermediate message transformer (also simply called a mapper) 18. A message map 82 employed by the message mapper 18 may be constructed by the map generator 20 of FIGS. 1 and 2.

The first example source system 14 employs a source message schema 80 (e.g., including schema definitions and associated rules) to encode source message data elements 50 into one or more messages 96. The one or more messages 96 are encoded, structured, and/or otherwise formatted in accordance with the source message schema 80.

An example source message content 52 pertains to a person, and includes a name and state. An example message format and accompanying data is as follows: {"name": "Alice Jones", "state": "CA"}.

After a source message signal 96 representing the source message content 52 is sent to the message mapper 18 in preparation for delivery to the target system 16, the message mapper 18 employs the message map 82 to transform, i.e., translate the source message content 52 contained in the source message signal 96. An example map 82 usable by the message mapper includes various mappings 90 follows:

TABLE 1

| Target Message Field | Mapping |
| --- | --- |
| "first_name" | getFirst(split("name", " ")) |
| "last_name" | getLast(split("name", " ")) |
| "state" | lookup("US_States", "CA") |

Note that the example message map 82 and accompanying example mappings 90 determines target fields or data elements 92 based on individual mappings 94 applied to each field 92. The mappings 94 are determined by the map generator 20 of FIGS. 1 and 2, which has determined that the combined name field (which includes first and last name in a single field) of the source message 52 must be split into two separate fields (representing a first name and a last name) as indicated in the target message fields 92 of the example map 82 and accompanying mappings 90.

Note that the function "lookup( )" shown in Table 1 involves selection of a table that relates different spelling of names of states to each other. The function selects the table "US_States" and looks up the corresponding value of "CA," and returns "California" in response thereto.

After the mappings 90 are applied to the source message 96 via the message mapper 18, the resulting message elements or fields are incorporated into a target message signal 98, which is readable by and delivered to the target system 16.

The target system 16 employs a target message schema 84 to read and interpret target message content 88, which may be stored in a database of the target system 16 or otherwise used in one or more processes implemented by the target system 16.

FIG. 4 is a simplified fourth block diagram illustrating the two example systems 14, 16 of FIG. 3 involved in a sequence of exchanged messages 104-112 via the message mapper 18 of FIGS. 1-4.

In the example simplified embodiment of FIG. 4, the message mapper 18 (which, in certain embodiments, may be implemented as an integration service) is hosted in a cloud 100, e.g., a set of one or more servers accessible via a network, such as the Internet.

Message exchanges 104-112 between the first system 14 and the second system 16 occur via respective adapters 44, 102. The example message exchange 104-112 includes an initial source message 104 that is sent from the first system 14 to the message mapper 18 via a first system adapter 44. The source message 104 is destined for the second system 16, but is intercepted and translated by the message mapper 18, which converts the source message 104 into a translated source message 106, which represents a target message that is delivered to the second system 16 (which initially acts as the receiving system) via a second adapter 102 thereof.

The second system 16 then generates a response message 108, which is output via the second adapter 102, in response to receipt of the target message 106. The response message 108 is delivered to the message mapper 18, which applies one or more mappings applicable to translation of response messages of the second system 16 into a message readable by the first system 14, in advance of delivering a translated response message 110 (which then becomes a target message) to the first system 14 via the first adapter 44.

Note that when the second system 16 sends the response message 108 to the first system 14 via the intermediate message mapper 18, the second system 16 becomes the source system, and the first system 14 becomes the target system for that message exchange.

Sometimes, in response to receipt of initial translated source message 106, the second system 16 will send an error message 112 instead of or in addition to the response message 108. In such case, the error message 112 is translated by the message mapper 18 in accordance with one or more mappings applicable to translating error messages between the systems 14, 16. The resulting translated error message 114 is then forwarded by the message mapper 18 to the first adapter 44 of the first system 14 as a target message comprising a translated error message.

Note that the message mapper 18 has access to various mappings governing exchange of messages between the systems 14, 16, including mappings for translating initial source messages, response messages, and error messages. To automatically develop such mappings, the map generator of FIGS. 1-2 may use source messages output from the systems 14, 16 in response to injection of test datasets; then send the source messages to the systems 14, 16 to obtain response messages and/or error messages, which are then analyzed by the map generator 20 and accompanying controller 52 and data differencing module 66 to generate additional mappings for response messages and error messages.

The mappings used to map the source messages, response messages, error messages, and other message types between two systems may represent a group of maps assigned for translating communications between the systems 14, 16.

Note that source messages, return messages, and error messages can flow in both directions. Accordingly, mappings are generated for each direction and for each type message (e.g., source, return, error). In particular, for the present two-system case, six mappings may be generated, including two mappings (one for each direction) for original message transformation; two mappings for response message transformation; and two mappings for error message transformation. Note that, in the present example embodiment, when creating maps for response messages (also called return messages herein), before sending a target message based on a triggered source message, the systems to be integrated are reset so that all previously loaded test data is removed. In certain implementations, this may help to avoid a duplicate data error that might be returned.

In general, after map creation for a pair of message schemas, the map is used for the actual message instance transformation at runtime. When a message instance is sent from a source to a target, the corresponding map is determined, and then the mappings are executed to generate the target message instance from the source message instance.

Figure 5:
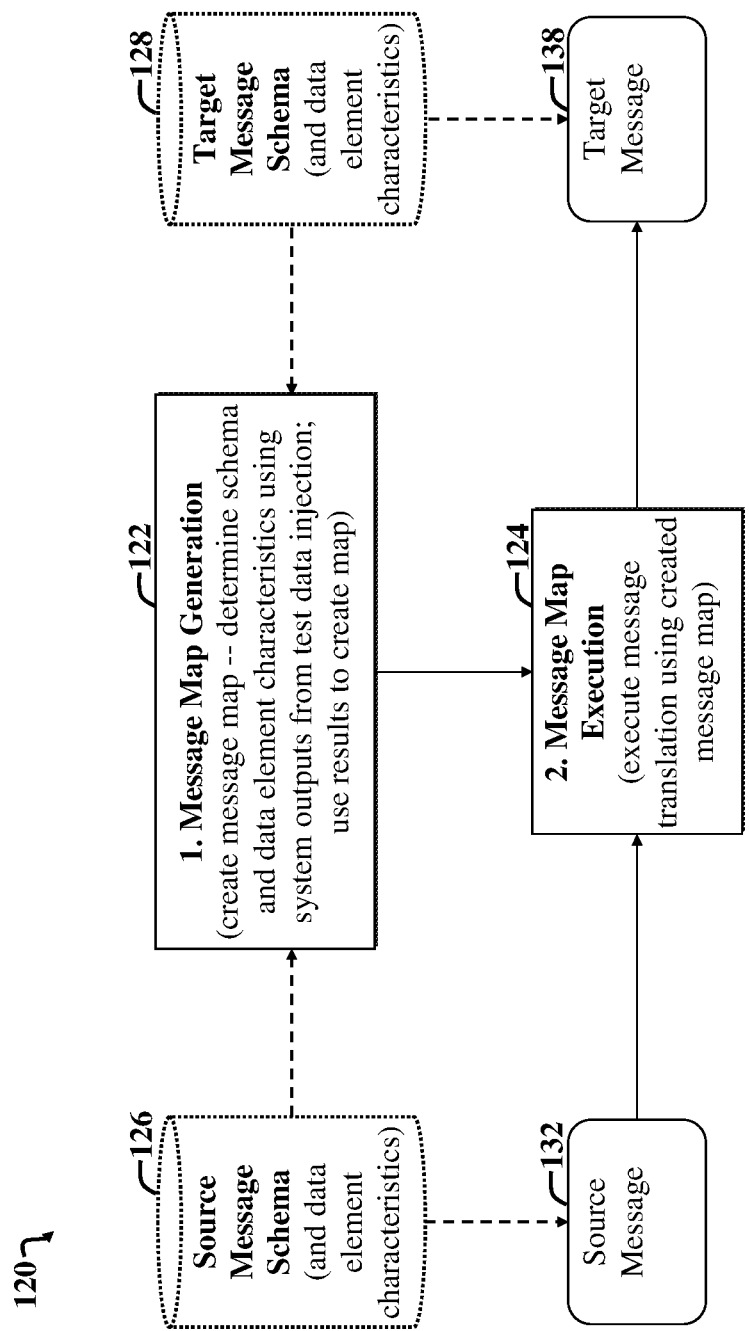
FIG. 5 is a process flow diagram illustrating a combination of message map creation and message map execution, leveraging source message schema and data element characteristics and target message schema and data element characteristics to transform a source message into a target message, wherein the process illustrated by the process flow diagram may be implemented via the embodiments of FIGS. 1-2.

FIG. 5 is a process flow diagram illustrating a combination of message map creation 122 (e.g., via the map generator 20 of FIGS. 1-2) and message map execution 124 (e.g., via the message mapper 18 of FIGS. 1-2), leveraging source message schema 126 and data element characteristics and target message schema 128 and data element characteristics to transform a source message 132 into a target message 138. The process 122-124 illustrated by the process flow diagram of FIG. 5 may be implemented via the embodiments of FIGS. 1-2.

The message map generation step 122 involves creating a message map, in part by determining different message schemas and data element characteristics of source and target messages using system outputs derived from messages generated via test dataset injection into the systems; then generating a message map sufficient to translate a source message from a first system into a target message readable by a second system.

The message map execution step 124 includes executing a message map to thereby translate a source message 132 into a target message 138. The message map execution step 124 may be implemented during runtime to integrate systems via the message mapper 18 of FIG. 1-2.

Figure 6:
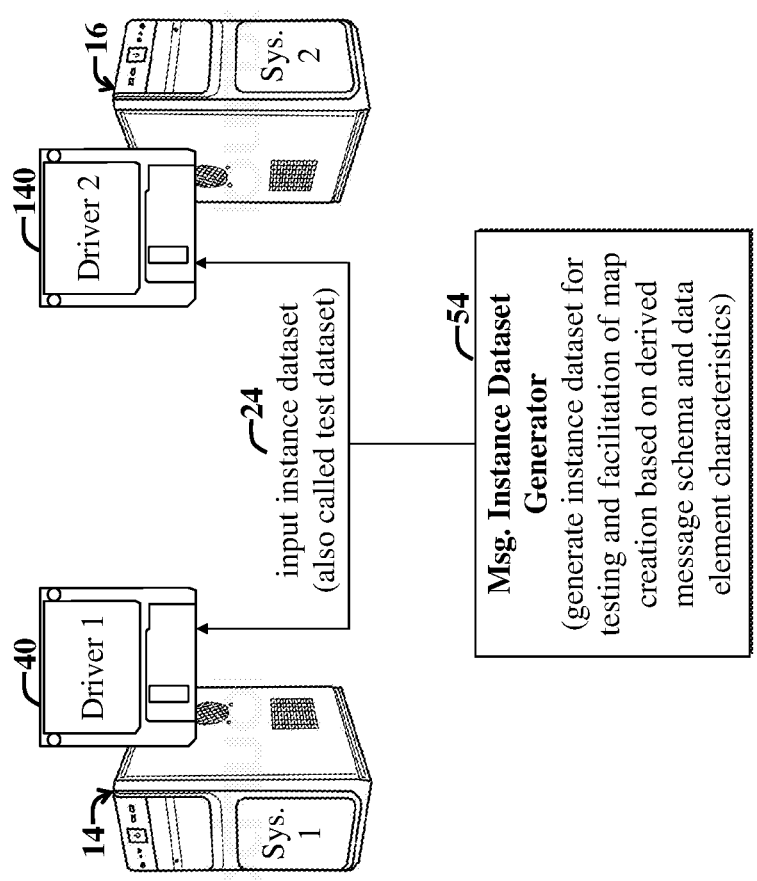
FIG. 6 is a simplified fifth block diagram illustrating use of system drivers by an instance dataset generator (e.g., of the message map generator of FIGS. 1-2) to insert test datasets (also called instance datasets) into systems being integrated.

FIG. 6 is a simplified fifth block diagram illustrating use of system drivers 40, 140 by an instance dataset generator (e.g., of the message map generator 20 of FIGS. 1-2) to insert test datasets (also called instance datasets) into systems 14, 16 being integrated.

The message instance dataset generator 54 of FIG. 6 may send generated test datasets, which have been generated in accordance with one or more test dataset templates (e.g., the instance dataset template(s) 60 of FIG. 2), to the drivers 40, 140 for injection into the respective systems 14, 16. The test datasets 24 sent from the test dataset generator 54 may be routed through the controller 52 of the map generator 20 of FIG. 2.

In an example scenario, the test dataset 24 includes a full address containing a first name, last name, street name, street number, zip code, city name, state, country. Several of such test datasets can be generated. Specific drivers, e.g., drivers 40, 140, are then used to load the test dataset into the systems 14, 16. The test dataset generator 54 passes test data to the drivers 40, 140, which then load the test data into the systems 14, 16.

The drivers 40, 140 have access native interfaces of the systems 14, 16 to facilitate loading a test dataset. Adapters are not necessarily required for test data injection, as adapters primarily support message exchange and not necessarily instance loading as to the drivers 40, 140.

Driver loading may occur automatically once the test dataset 24 is provided to a driver 40, 140 by the instance dataset generator 54. When automatic loading is not possible, and a driver 40, 140 receives a test dataset, then the driver 40, 140 may issue a notification to the operator computer system (e.g., computer 22 of FIG. 2), which may notify a human operator of the need to manually enter the test dataset, e.g., through a desktop or browser-based UI display screen. Such notifications or manual loading requirements may happen in certain implementations where a system being integrated does not implement a driver-accessible API for enabling data entry, and only allows manual entry.

Recall that test datasets are generated by the dataset generator 54 based on a dataset template (e.g., the template(s) 60 of FIG. 2). The schema portion (e.g., fixed portion 62 of FIG. 2) may state, for example, that an address has a first name, last name, street name, street number, etc. It may also state that the zip code is optional (e.g., for countries like Ireland, etc.); that the state is optional (e.g., in countries where the state need not be mentioned in the address); and/or that other data elements are mandatory. Schema may further specify a data type for each schema element.

With reference to FIG. 2, the variable portion 64 includes the values for different schema elements. In the present example embodiment, each mandatory schema element requires, in accordance with instantiation rules, a value, when the template is instantiated to create a test dataset. The template(s) 60 can be populated repeatedly with different data values. One template is usable to generate a list of many test datasets. Instantiation rules prescribe how the data values are created.

Exact instantiation rules are implementation specific and may vary, without departing from the scope of the present teachings. In the present specific embodiment, four primary instantiation rules are employed. A first rule specifies that each value in a test dataset must be unique, thereby facilitating locating different values in messages. A second rule specifies that the values between different test datasets (of at least one data item) must be different so that test datasets can be distinguished. A third rule specifies that all combinations of mandatory and optional data items are created, e.g., one test dataset will have a zip code; another test dataset will not have a zip code. In cases where data items are of enumeration type, a fourth rule specifies allowed enumeration values.

Note that in a special case, where both systems 14, 16 do not accept the same enumeration; then the same test dataset will not be loaded into both systems 14, 16, as one system will return an enumeration value error. In this case, two slightly different test datasets may be generated, each with enumeration values only (where the other values are similar between datasets). This may trigger a domain value lookup in the map (e.g., by the message mapper 18 of FIG. 2). A domain value table can be derived from the enumeration values in the rules.

Note that in the present example embodiment, data items are typed, and the test datasets are compliant with allowed types, e.g., so that a test dataset is not rejected because of type incompatibilities.

Note that instantiation rules are not necessarily fixed, but may be modifiable. Rules can be modified or removed and/or new instantiation rules can be added, depending upon the particular systems integration at hand. In general, the instantiation rules aim to instantiate test dataset templates so that for given a message, the corresponding test dataset can be uniquely identified.

Note that to implement instantiation rules, existing rule languages can be used or a specific rule language can be created to generate data instance sets. A programming or scripting language can be used to create test datasets. Those skilled in the art with access to the present teachings may readily develop and implement instantiation rules and accompanying map generators, message mappers, and system drivers, to meet the needs of a given implementation without undue experimentation.

Figure 7:
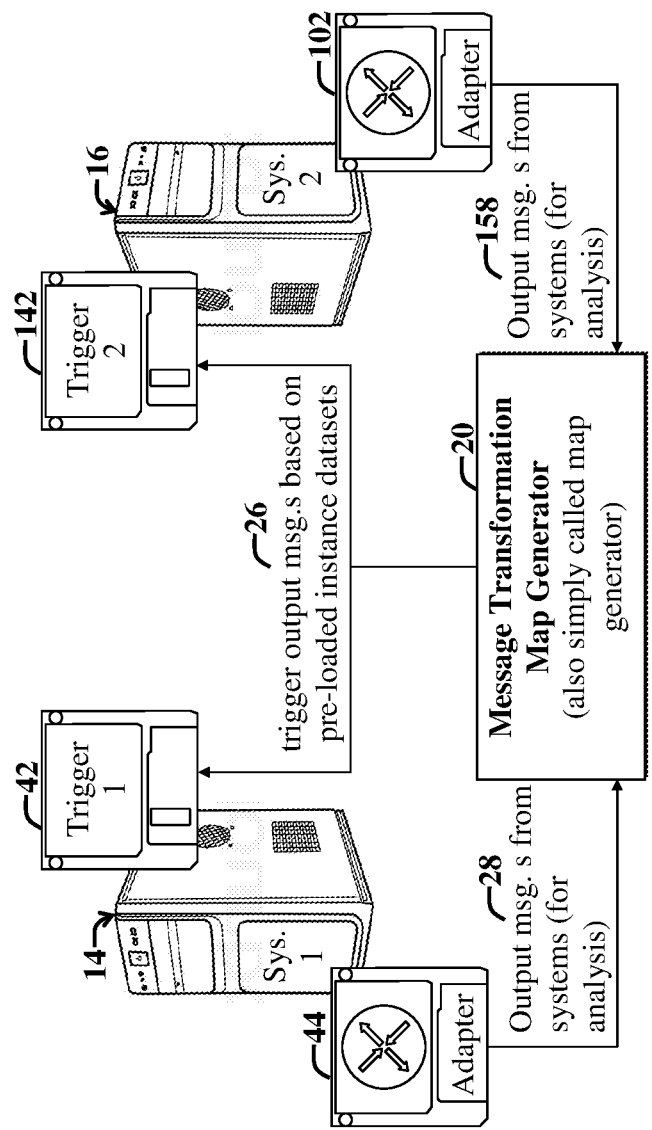
FIG. 7 is a simplified sixth block diagram illustrating use of system trigger components by the message map generator of FIGS. 1-2 to trigger sending of messages to the message map generator based on test datasets input to the systems being integrated.

FIG. 7 is a simplified sixth block diagram illustrating use of system trigger components 42, 142 (of respective systems 14, 16) by the message map generator 20 of FIGS. 1-2, to send a trigger signal 26 to the systems 14, 16 to thereby trigger sending of source messages 28, 158 to the message map generator 20 based on test datasets input to the systems being integrated.

Note that while, for clarity, the trigger signal 26 is shown in FIG. 7 as being directly delivered to the trigger components 42, 142 in FIG. 7, that in practice, the signal 26 may be delivered to the trigger components 42, 142 via drivers (e.g., the drivers 40, 140 of FIG. 6) and/or via the respective system adapters 44, 102. Note that source messages containing instance data (i.e., test data) from the previously injected test datasets may be delivered to the map generator 20 via the system adapters 44, 102.

In summary, once test datasets are loaded into the systems 14, 16 to be integrated, corresponding output messages 28, 158 are triggered. Each system 42, 142 is linked to a trigger component 42, 142 that causes messages to be generated within the systems 14, 16. The trigger components 42, 142 may be invoked by the map generator 20 after creation of the test datasets.

For each test dataset, a corresponding message is triggered. The triggered messages 28, 158 can be created by a system 14, 16 in any order, as the map generator 20 does not depend upon a specific order of messages.

After triggering, messages become available to the map generator 20 through system adapters 44, 102. The map generator 20 knows that the test datasets that it loaded into the systems 14, 16 via the drivers (e.g., the drivers 40, 140 of FIG. 6) and knows when all corresponding messages 28, 158 from each of the systems 14, 16 are received. The map generator 20 includes modules (e.g., the controller 52 and data differencing module 66 of FIG. 2) for correlating messages and proceeding with map creation.

As set forth above, but detailed more explicitly here, for each test dataset injected into two systems 14, 16, the map generator 20 loads a pair of corresponding messages. The map generator 20 leverages the uniqueness of the data items created (and included in the messages 28, 158) according to the instantiation rules to not only correlate the various schema elements of messages to each other but to correlate the various data elements of the messages.

If both messages 28, 158 contain a schema element called city, and the schema element contains the same value in each of the messages, then the map generator 20 can determine that the mapping between the two messages is the identity function (i.e., copy function).

If multiple test datasets are created for a given template, then several sub-maps (also called individual mappings or transformations herein) are created for the same pair of message schemas. The sub-maps may be combined into a single map. For example, if an optional field is populated in one test dataset but not in another, this will result in two different mappings. One mapping will map the values, and the other mapping will not, as the source message does not have a value. The map generator 20 then combines the two mappings so that one map is used for each data field or element, since, in the present example embodiment, only one map shall cover all variations of data in a field. For example, in the case of an absent value, the map can contain a conditional check that determines if the source message has a value or not; then process the source value accordingly.

Individual mappings are directional (i.e., different for different source-to-target translations), such that a mapping from one message to another can be different from the opposite direction. For example, one message may have a first and last name separated into two fields, whereas the other message may have the first and last name concatenated by a blank. In one direction, the map generator 20 may determine that first and last name are concatenated with a blank, whereas in the opposite direction, the name is split, with the blank being the split criteria.

Since the map generator 20 may be unaware of how the systems 14, 16 will be integrated, the map generator 20 may generate one map for each direction. In some cases, the full list of mappings for both messages is not generated. The map generator 20 will then flag the map as being incomplete and may issue a notification or request (e.g., where the request is accessible via the operator computer 22 of FIG. 2) that a user manually review the derived set of mappings and complete the set as necessary.

Figure 8:
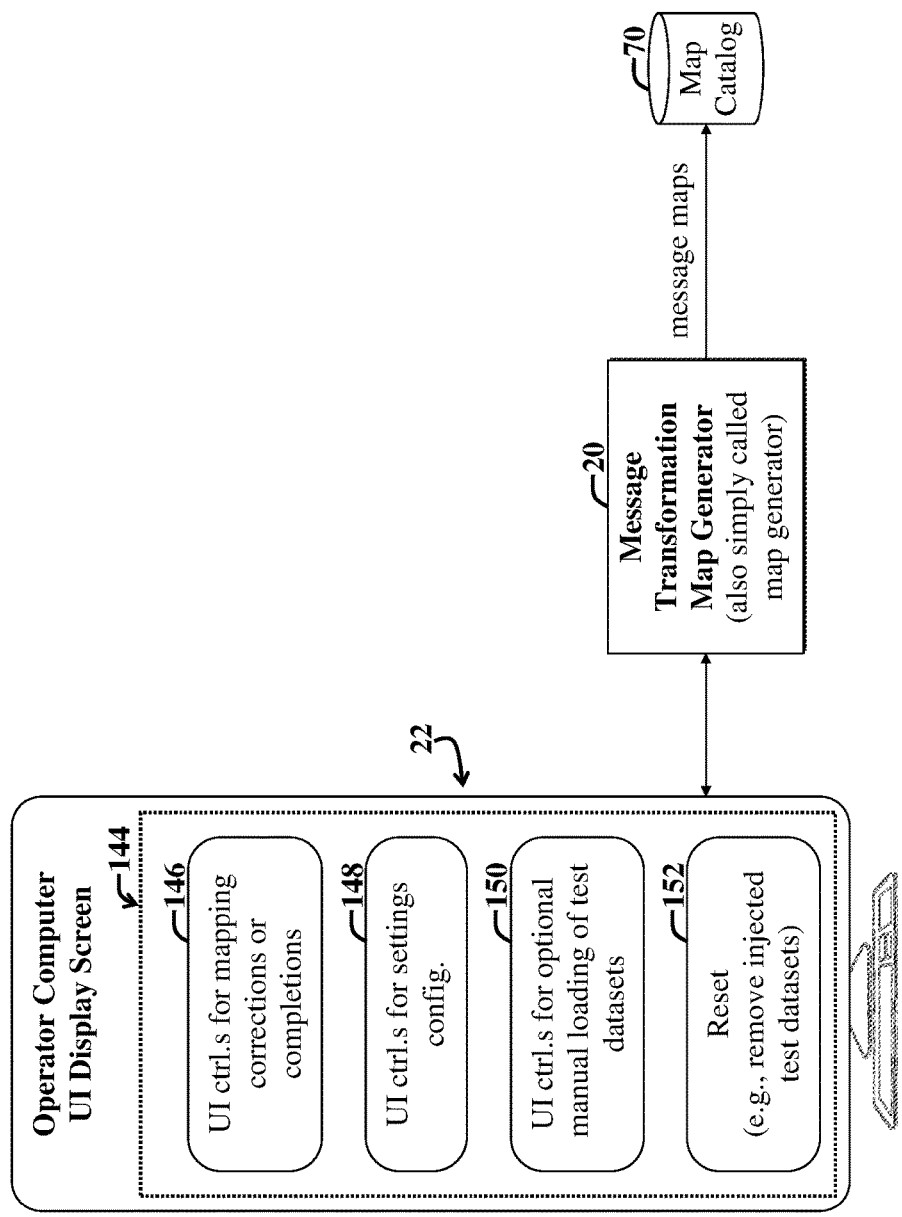
FIG. 8 is a simplified seventh block diagram illustrating example communications between the message map generator, operator computer, and map catalog of the system of FIG. 2.

FIG. 8 is a simplified seventh block diagram illustrating example communications between the message map generator 20, operator computer 22, and map catalog 70 of the system 10 of FIG. 2.

The example operator computer 22 includes a User Interface (UI) that includes a UI display screen 144 that provides various operator UI controls 146-150.

For the purposes of the present discussion, a UI may be any collection of hardware and/or software that facilitates illustrating data and/or providing access to software functionality associated with the UI. A software UI may be any collection of one or more UI display screens associated with software.

A UI display screen may be any software-generated depiction presented on a display. Examples of depictions include windows, dialog boxes, displayed tables, and any other graphical UI features, such as UI controls, presented to a user via software, such as a browser. A UI display screen contained within a single border is called a view or window. Views or windows may include sections, such as sub-views or sub-windows, dialog boxes, graphs, tables, and so on. In certain cases, a UI display screen may refer to all application windows presently displayed on a display.

A UI control may be any displayed element or component of a UI display screen, which is adapted to enable a user to provide input, view data, and/or otherwise interact with a UI. Additional examples of UI controls include buttons, drop down menus, menu items, tap-and-hold functionality, and so on. Similarly, a UI control signal may be any signal that is provided as input for software, wherein the input affects a UI display screen and/or accompanying software application associated with the software.

The example operator UI display screen 144 may be displayed via a browser which has navigated to an address corresponding to a Web application that communicates with the controller 52 of the map generator 20 of FIG. 2. The UI display screen 144 includes one or more UI controls 146 for enabling a user to correct, complete, or otherwise adjust automatically generated mappings, in implementations where such adjustments are in order.

Additional UI controls 148 provide options for adjusting additional settings or configurations of the map generator 20, e.g., for adjusting message instantiation rules used to generate test datasets via the dataset template(s) 60 of FIG. 2; for adding test data to the instance data database 56 of FIG. 2, etc. Another set of one or more UI controls 150 provide options for enabling manual specification and loading of test datasets into systems being integrated, e.g., where the systems are not readily amenable to drivers that would enable automatic injection of test datasets thereto. Another set of one or more UI controls 152 provide options for enabling clearing or deleting test datasets that have been injected into systems being integrated and/or to otherwise reset data and settings of the map generator 20.

Note that user selection of UI controls of each of the sets of one or more UI controls 146-150 may trigger display of additional UI display screens and/or wizards with additional UI controls, without departing from the scope of the present teachings. The UI controls 146-150 are merely examples and are implementation specific. Additional, different, or no UI controls may be provided, depending upon the needs of a given implementation, without departing from the scope of the present teachings.

Accordingly, the UI display screen 144 provides various options enabling operators make mapping corrections, completions, to manually load test datasets into systems lacking drivers, to clear test datasets from systems, and so on.

Figure 9:
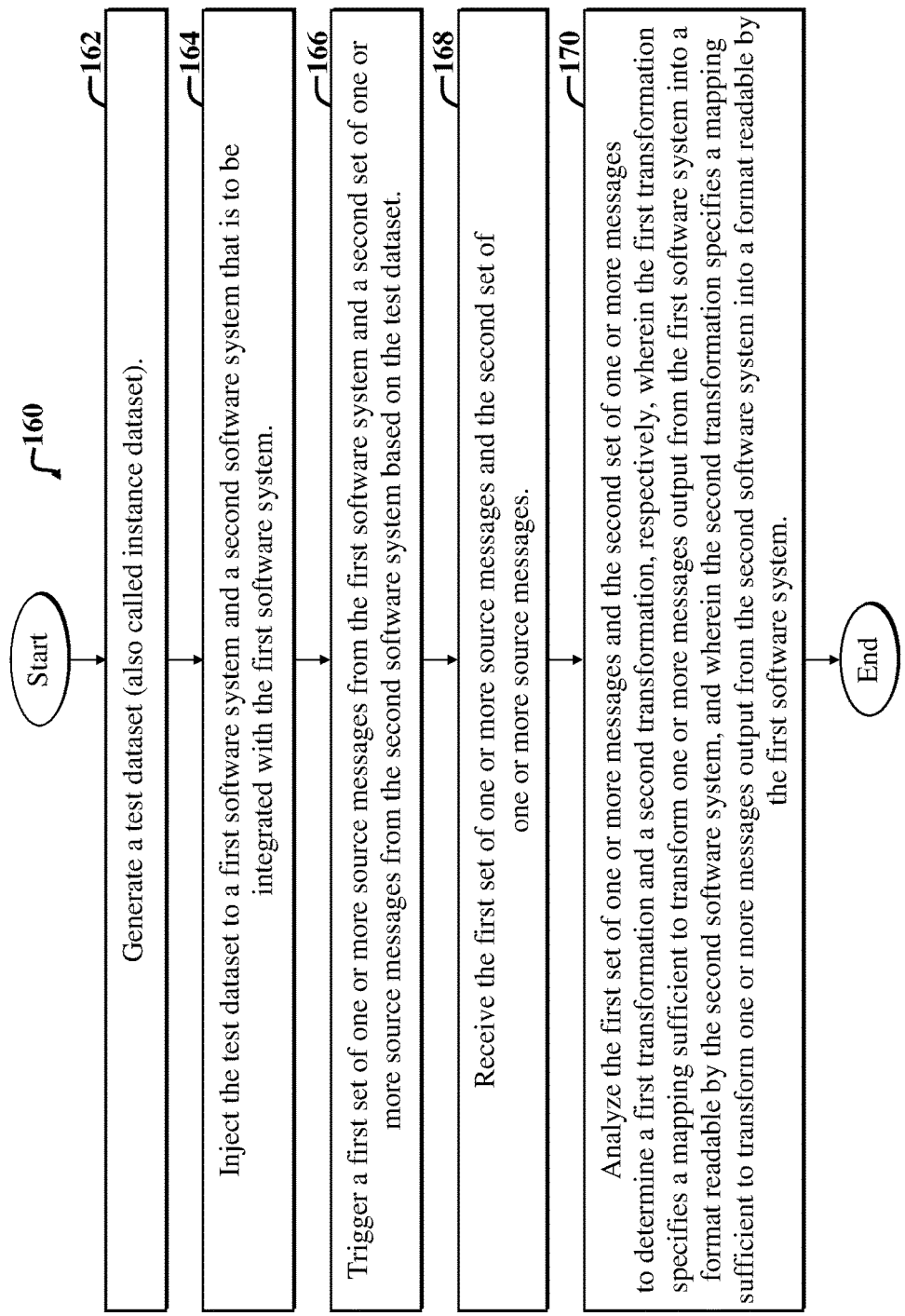
FIG. 9 is a flow diagram of a first example method for creating a message map, the method implementable via the embodiments of FIGS. 1-8.

FIG. 9 is a flow diagram of a first example method 160 for creating a message map, wherein the method 160 is implementable via the embodiments of FIGS. 1-8. The first example method 160 facilitates integrating software systems and includes a first dataset-generation step 162 from the perspective of a message mapper, e.g., the message mapper 20 of FIGS. 1-2.

The first dataset-generation step 162 includes generating a test dataset, also called an instance dataset.

A second dataset-injection step 164 includes inputting or injecting the test dataset (e.g., represented by the message 24 of FIG. 2) into a first software system (e.g., the system 14 of FIG. 2) and a second software system (e.g., the system 16 of FIG. 2), wherein the second software system is to be integrated with the first software system and vice versa.

A third message-triggering step 166 includes triggering a first set of one or more source messages (e.g., the output message(s) 26 of FIG. 2) from the first software system and a second set of one or more source messages from the second software system based on the test dataset.

A fourth message-receiving step 168 includes receiving (e.g., receiving by the message mapper 20 of FIG. 2) the first set of one or more source messages and the second set of one or more source messages.

A fifth message-analyzing step 170 includes analyzing the first set of one or more messages and the second set of one or more messages to determine a first transformation and a second transformation, respectively, wherein the first transformation specifies a mapping sufficient to transform one or more messages output from the first software system into a format readable by the second software system, and wherein the second transformation specifies a mapping sufficient to transform one or more messages output from the second software system into a format readable by the first software system.

Note that the method 160 may be modified, without departing from the scope of the present teachings, e.g., the various steps 162-170 may modified or augmented, rearranged, or certain steps may be omitted.

For example, the method 160 may be modified or augmented to further specify that the method 160 further includes sending a first message of the first set of one or more source messages to the second software system, thereby triggering a first response message from the second software system; sending a second message of the second set of one or more source messages to the first software system, thereby triggering a second response message from the first software system; and analyzing the first response message and the second response message to determine a third transformation and a fourth transformation, respectively, wherein the third transformation specifies a mapping sufficient to transform one or more response messages from the second software system into one or more corresponding response messages readable by the first software system, and wherein the fourth transformation specifies a mapping sufficient to transform one or more response messages from the first software system into one or more corresponding response messages readable by the second software system.

The first example method 160 may further specify that the first message-generating step 162 further includes using a test dataset template and test data to generate the test dataset in accordance with one or more instantiation rules. One instantiation rule may specify that each value in a test dataset must be unique. Another instantiation rule may specify that values in different test datasets generated from the same test dataset template must differ to enable differentiating test datasets. Another instantiation rule may specify that test datasets for each combination of mandatory and optional data items must be created (e.g., one instance data set may have a zip code; another instance data may not have a zip code), and so on.

The test dataset template may include a fixed portion and a variable portion. The fixed portion may include information describing one or more message schemas. The variable portion includes information describing one or more data elements arranged and formatted in accordance with the one or more message schemas. The one or more instantiation rules may include one or more modifiable instantiation rules. The modifiable instantiation rules may be modifiable via user interaction with an operator computer system (e.g., the operator computer system 22 of FIG. 2). Alternatively, the modifiable instantiation rules may be selectively automatically modified by software based on predetermined conditions.

The second dataset-injection step 164 may further include using a message transformation map generator to provide the test dataset to a first driver for the first software system and to a second driver for the second software system, so as to enable generation of the first set of one or more source messages and the second set of one or more source messages, respectively. The first driver may communicate with one or more first native interfaces of the first system. Similarly, the second driver may communicate with one or more second native interfaces of the second system. The first driver and the second driver may further communicate with the message transformation map generator.

The third message-triggering step 166 may further include employing a first trigger component of the first software system and a second trigger component of the second software system to trigger output of the first set of one or more source messages and the second set of one or more source messages, respectively. The first trigger component may communicate with a first software adapter of the first software system. Similarly, the second trigger component may communicate with a second adapter of the second software system. The first adapter and the second adapter may further communicate with a first set of one or more native interfaces of the first software system and a second set of one or more native interfaces of the second software system.

The first example method 160 may further include establishing communications between the first software system and second software system via an intermediate message mapping system (e.g., the message mapper 18 of FIG. 2), wherein the intermediate message mapping system communicates with the first software system via the first adapter, and wherein the intermediate message mapping system communicates with the second software system via the second adapter.

The fourth message-receiving step 168 may further include collecting all of the first set of one or more source messages and all of the second set of one or more source messages in advance of performing the step of analyzing, i.e., the fifth message-analyzing step 170.

The fifth message-analyzing step 170 may further include comparing (e.g., via the data differencing module 66 of FIG. 2) the first set of one or more source messages and the second set of one or more source messages to determine one or more differences; and then using (e.g., employing the controller 52 of FIG. 2) the one or more differences to generate the first transformation and the second transformation.

The fifth message-analyzing step 170 may further include submitting instructions characterizing the first transformation and the second transformation to a map catalog (e.g., the map catalog 70 of FIG. 2); then employing a message mapping system (e.g., the message mapper 18 of FIG. 2) to selectively reference the map catalog to facilitate translating, in accordance with the first transformation and the second transformation, one or more messages to be exchanged between the first software system and the second software system.

The first example method 160 may further include providing one or more UI controls for enabling a user (also called operator herein) to manually load test data into the first software system or second software system, e.g., when the first software system or the second software system lack mechanisms to enable automatic loading of the test dataset into the first software system or the second software system. One or more additional UI controls may enable an operator to manually specify or otherwise adjust one or more data elements of the test dataset and/or one or more rules of a generated message map or constituent sub-map or transformation.

The method 160 may further include creating a test dataset template for each type of message to be mapped (e.g., source message, response message, error message, etc.); defining one or more test dataset instantiation rules for creating unique test datasets from test dataset template (also called in instance dataset template); and executing the instantiation rules for each test dataset template to facilitate creating several unique test datasets.

The example method 160 may further specify that data value that is inserted into a test dataset must be unique and within the context of the test dataset. The number of created test datasets may be determined by the number of unique combinations of value variations (e.g., combinations of optional and/or mandatory values). An upper limit for the number of test datasets created may be a function of the upper limit of data value sizes that are to be included in the test dataset, where the term "data value sizes" herein refers to a number of data elements in a data object being incorporated into one or more messages corresponding to a test dataset. Note that additional or different dataset instantiation rules are possible and may vary depending upon the particular dataset template being used to create test datasets.

An alternative but similar method to the first example method 160 for generating a message map includes injecting or loading the source and target systems with the generated test datasets using one or more driver components of the source and target systems; triggering output messages from the systems using one or more trigger components of the source and target systems, to thereby initiate the sending of messages for each test dataset that was loaded into each of the two systems; continuing to receive messages until a message from every system corresponding to a test dataset is received; and performing an automatic comparison of each field in the pair of messages for a given test dataset, thereby deriving a mapping for each of the two mapping directions (i.e., from the source system to the target system and vice versa) based on determined message schema and data element differences as determined via the automatic comparison.

Note that if more than one test dataset was created using a single test dataset template, then more than one pair of messages is present for the same source and target message schema. All of such mappings may be combined into a single map. Each mapping that is incomplete or could not otherwise be automatically derived may be flagged to facilitate use of an operator computer system and accompanying UI display screens and controls to implement or complete the mapping. Once all mappings for a pair of messages for each direction are determined (e.g., one or more mappings for each communication direction between two systems), the mappings may be stored as part of single map in a map catalog for the associated pair of systems.

Figure 10:
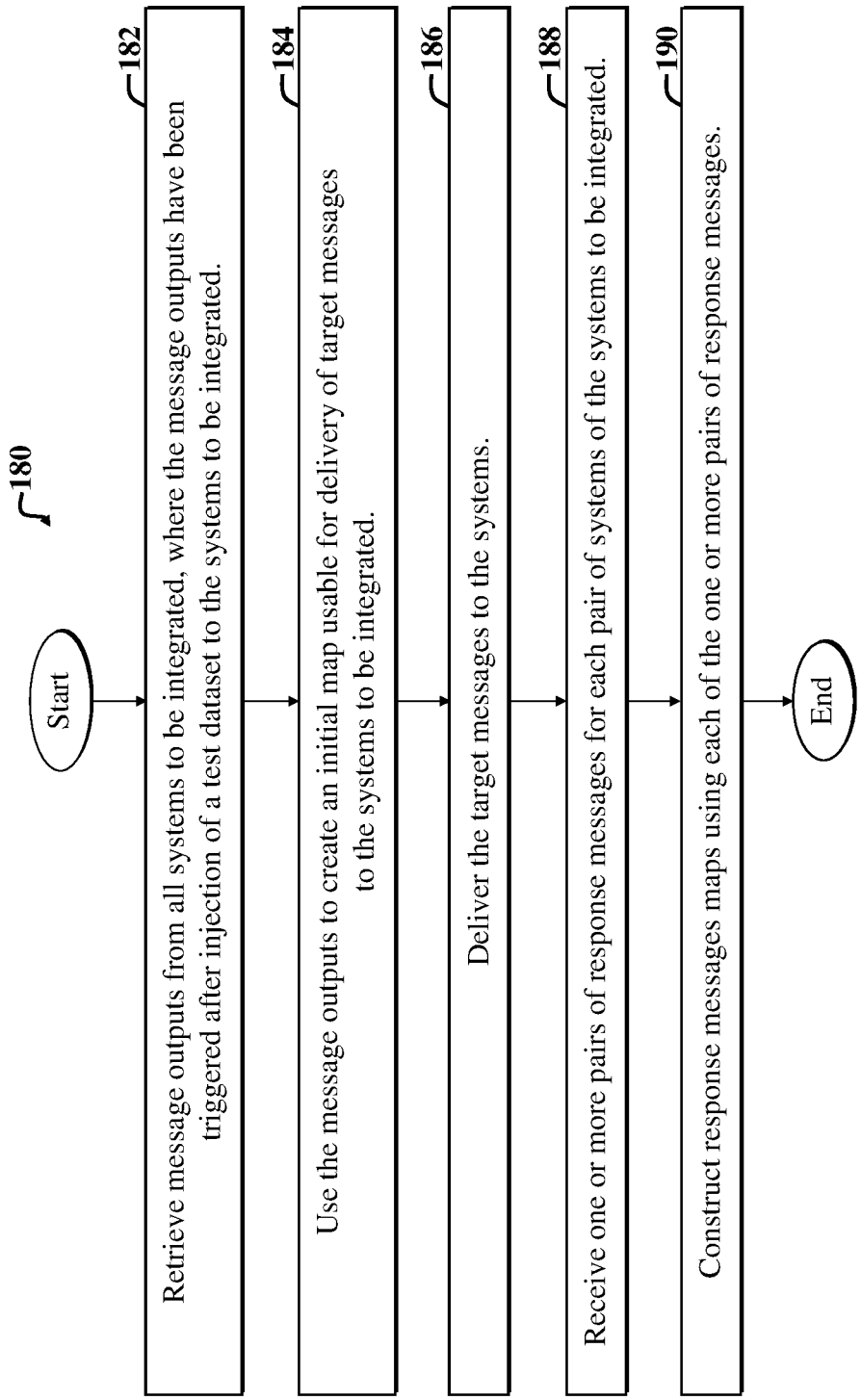
FIG. 10 is a flow diagram of a second example method for creating a return message map, the method implementable via the embodiments of FIGS. 1-9.

FIG. 10 is a flow diagram of a second example method 180 for creating a return message map, which accounts for different schemas and data element characteristics used by different systems being integrated to issue return messages in response to the receipt of target messages. The second example method 180 may be implemented via the embodiments of FIGS. 1-9.

The second example method 180 includes an initial message-retrieving step 182, which includes retrieving messages output from all systems to be integrated. The message outputs have been triggered after injection of one or more test datasets to the systems to be integrated.

A second output-using step 184 includes using the message outputs to create an initial map that may be used to deliver target messages to the systems to be integrated.

A third message-delivery step 186 includes delivering the target messages to the systems to be integrated. Note that in certain implementations, to facilitate message map construction, before sending a target message based on a triggered source message, the systems to be integrated are reset so that all previously loaded test data is removed. In certain implementations, this may help to avoid a duplicate data error that might be returned.

A fourth message-receiving step 188 includes receiving one or more pairs of response messages, e.g., one pair of response messages for each pair of systems to be integrated.

A fifth message-mapping step 190 includes generating one or more response message maps using each of the one or more pairs of response messages. Generation of the one or more response message maps may be implemented via the map generator 20 and accompanying data differencing module 66 and associated controller 52 of FIG. 2.

The method 180 may be modified, without departing from the scope of the present teachings. For example, the method 180 may further specify that generation of the response message maps involves performing the following steps for each pair of response messages received: automatically comparing each field (i.e., data element in the field) in the pair of messages for a given test dataset to thereby derive a mapping for each of the two mapping directions, i.e., from a first system to a second system to be integrated, and vice versa; determining if more than one test dataset was created by one template, and if so, then more than one pair of response messages are present for the same source and target message schema; marking or flagging each mapping that is incomplete (if any) or could not be automatically derived, thereby indicating that an operator computer may be used to complete any incomplete mappings; after all mappings for a pair of messages for each direction are determined, creating a map for each direction; and combining all response message mappings into a single response message map to be stored in a map catalog accessible to a message mapper.

Note that the second example method 180 may be further modified to further specify the following steps to facilitate return message map creation: retrieving all of the output messages that were sent from a system to a map generator in response to a map-generator trigger signal (e.g., the signal 26 of FIG. 2); stepping through each of the output messages, one-by-one, and for each output message, executing the following steps: determining the system from which the output message was sent (e.g., the first system acting as a source system); looking up the associated map catalog and retrieving any preexisting map for the two systems (e.g., first system and second system), including the source message type; creating a target message instance based on the output message and the retrieved map; sending the target message to the target system (e.g., second system); receiving the response message from the target system (e.g., second system, which then becomes the source system for the response message); performing the above steps to obtain a second response message from the first system; and using the second response message from the first system and the response message from the second system to generate a response message map for the first system and second system based on results of a comparison (e.g., data differencing operation) of the schemas and data element characteristics of the response messages. After completion of such steps, each message received by the map generator in response to a trigger will have been transformed into a target message, such that for every test dataset, two corresponding response messages are available.

Note that, for the purposes of the present discussion, the response messages may include one or more error messages, such that the second example method 180 may also be applicable to error messages.

Furthermore, note that, in a preferred embodiment, systems undergoing integration are not implementing ongoing processing that may interfere with message observation by the map generator. Note that messages can contain a message interaction identifier that identifies any related message. Furthermore, preferably, return message map creation is executed when both systems send back a return message in response to an original message. If one or both systems do not send back return messages, then no maps are necessarily required, and the return message map process may be skipped.

Furthermore, note that a target system can receive a particular message format based on the format (e.g., schema and associated data arrangements and structures) of the triggered message that was sent in response to the injection of a test dataset. However, mappings for return messages may be different that mapping applicable to source messages. Accordingly, additional steps may be performed to obtain mappings for return messages, as indicated above.

Hence, source messages are obtained in response to a trigger; then the source message formats (e.g., schema and data element characteristics) are compared to determine differences; then mappings are automatically generated to translate message formats in accordance with the differences. However, such mappings may be employed in both directions (e.g., from a first system to a second system and from the second system to the first system). Accordingly, such mappings are employed in both directions so as to obtain return messages for comparison and generation of associated return message mappings.

Figure 11:
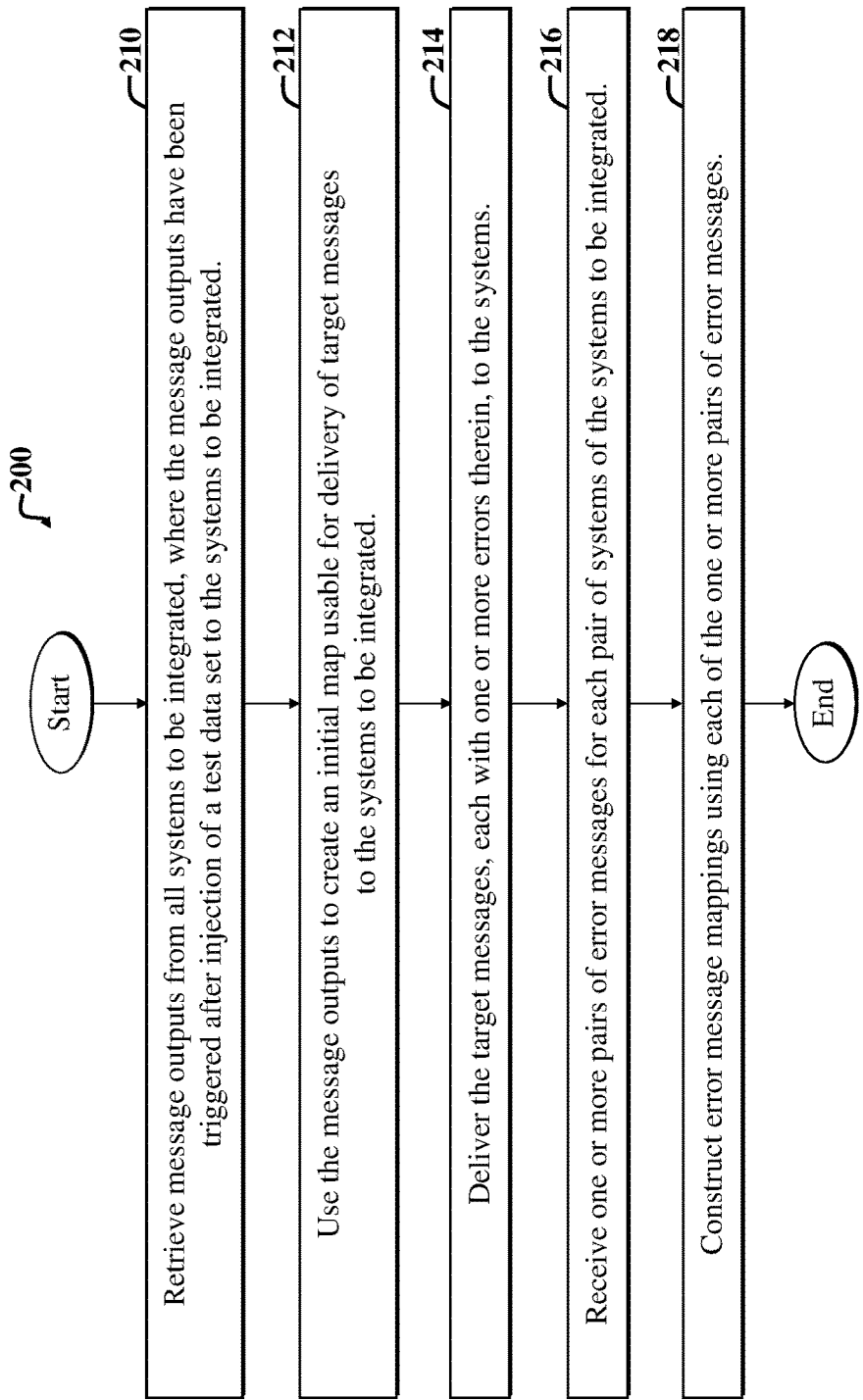
FIG. 11 is a flow diagram of third example method for creating an error message map, the method implementable via the embodiments of FIGS. 1-9.

FIG. 11 is a flow diagram of third example method 200 for creating an error message map, wherein the method 200 is implementable via the embodiments of FIGS. 1-9. The third example method 200 is related to the second example method 180 of FIG. 10, but is applicable to a specific type of return message, i.e., an error message.

The third example method 200 includes an initial message-retrieving step 210, which involves retrieving message outputs from all systems to be integrated, wherein the message outputs have been triggered after injection of a test dataset to the systems to be integrated.

A second message-using step 212 includes using the message outputs to create an initial map usable for delivery of target messages to the systems to be integrated.

A third message-delivering step 214 includes delivering (e.g., via the map generator 20 of FIG. 2) the target messages to the systems to be integrated. The target messages contain an error so that an error message is generated. For example, a number where there should be a string; or a missing value in a mandatory field, or a scrambled message that is incomplete or inconsistent.

A fourth message-receiving step 216 includes receiving one or more pairs of error messages for each pair of systems of the systems to be integrated.

A fifth map-constructing step 218 includes using each of the one or more pairs of error messages to construct one or more error message maps.

Note that the third example method 200 may be modified, without departing from the scope of the present teachings. For example, the method 200 may further specify that an error is introduced in response to a target message that has been configured to introduce an error; and that error message map creation is executed only if both systems to be integrated send back an error message in response to the original message when errors are present in the original message.

In the present example embodiment, if one or both systems being integrated do not send back error messages, then no maps are necessarily required, and the error message map creation process can be skipped.

Figure 12:
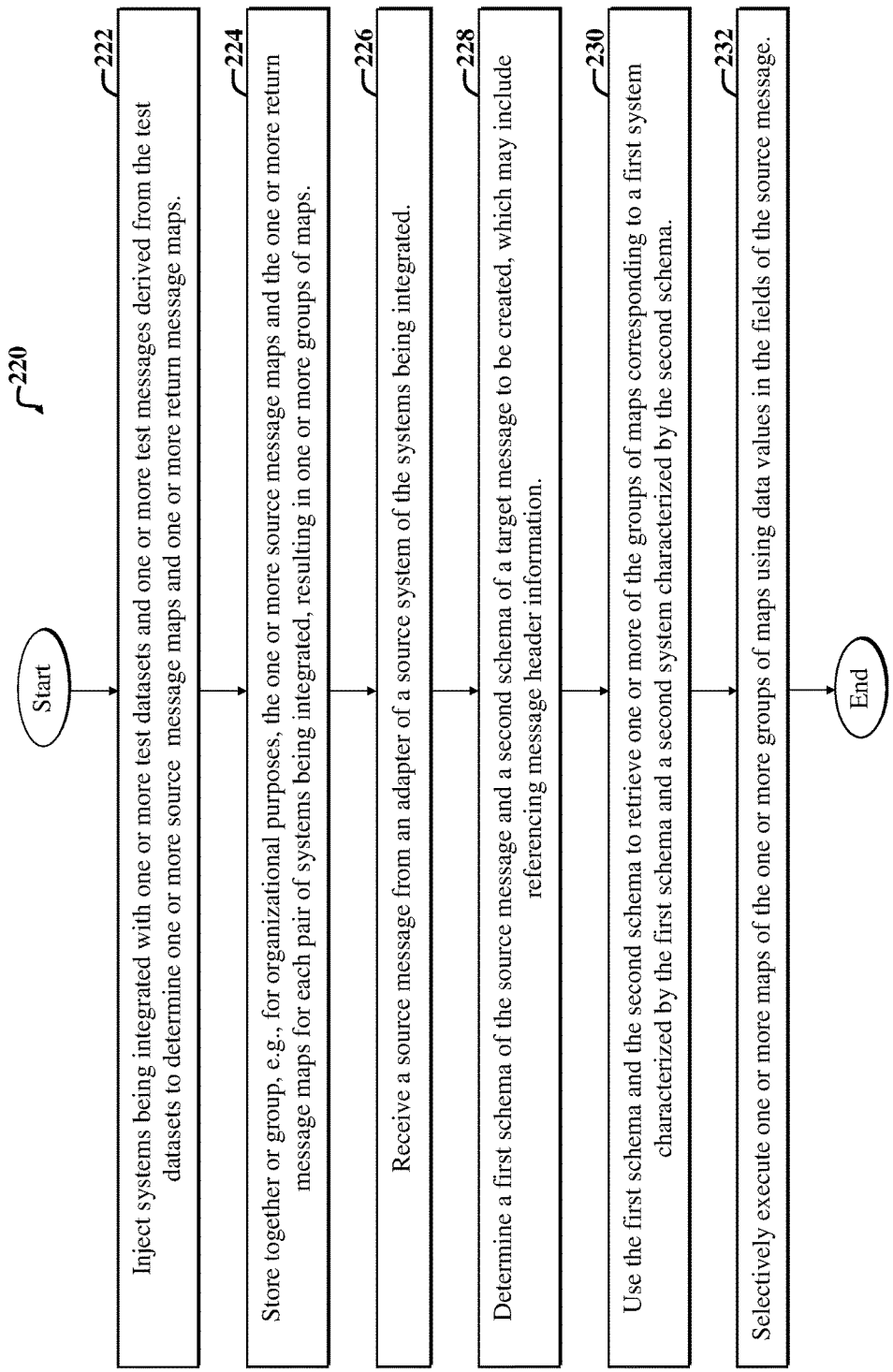
FIG. 12 is a flow diagram of a fourth example method for executing a transformation using a map, the method implementable via the embodiments of FIG. 1-8.

FIG. 12 is a flow diagram of a fourth example method 220 for executing a transformation using a map. The example method 220 is implementable via the embodiments of FIG. 1-8.

The fourth example method 220 includes a first step 222, which involves injecting systems being integrated (e.g., a first system and a second system) with one or more test datasets and one or more test messages derived from the test datasets, so as to determine one or more source message mappings and one or more return message mappings.

A second step 224 includes combining the one or more source message mappings and the one or more return message mappings for each pair of systems being integrated into one or more groups of maps, e.g., for organizational purposes.

A third step 226 includes receiving a source message from an adapter of a source system of the systems being integrated.

A fourth step 228 includes determining a first schema of the source message and a second schema of a target message to be created, e.g., by referencing message header information and/or by analyzing schema grammar of a message payload.

A fifth step 230 includes using the first schema and the second schema to retrieve one or more of the groups of maps corresponding to a first system characterized by the first schema and a second system characterized by the second schema.

A sixth step 232 includes executing the one or more maps of the one or more groups of maps using data values inserted into the fields of a source message and converting a formatting of the data values in accordance with one or more maps of the one or more groups of maps to yield a target message readable by one or more target systems. Note that the target system(s) is to be a recipient of the target message, which represents a translated source message that has been translated in accordance with the one or message maps. Note that in a specific implementation, only one map is used for a given message type with a given source and a given target system. So only one map is being executed. In other words, there is one map for each direction for each pair of message types (where in this context, "message type" corresponds to different schemas and associated data element characteristics and message formatting used by different systems being integrated, such that one message type exists for the source system, and another message type exists for the target system), such that six maps exist, i.e., two for regular messages, two for error messages, and two for return messages, for two systems (source and target) and a given message type each. Note however, that embodiments are not limited thereto, e.g., a given source message may be sent to plural target systems or vice versa, and integration need not always be one-to-one, but can be, for example, unidirectional one-to-many. Furthermore, it can be possible to use plural maps for a single translation or transformation of a message from a source message to a target message, e.g., as may occur when a particularly complex source message is processed using several constituent mapping operations, wherein each operation may leverage a sub-map (also called a mapping, which may represent a type of map) of a larger map. Note that, for the purposes of the present discussion, a map that specifies more than one mapping operation may be considered to represent plural maps or sub-maps. For example, the map of Table 1 above may be considered to include three sub-maps or mappings. In general, a map may be any collection of one or more instructions (e.g., mappings, which may also represent maps) for transforming one or more elements of a source message sent from one system into one or more elements of a target message readable by another system.

Note that the method 220 may be modified, without departing from the scope of the present teachings. For example, the method 220 may alternatively specify the following steps: retrieving message outputs from all systems to be integrated, wherein the message outputs have been triggered after injection of a test dataset to the systems being integrated; using the message outputs to create one or more source message maps usable for delivery of target messages between each pair of systems being integrated; employing message outputs to trigger one or more pairs of return messages from each pair of the systems being integrated; utilizing the one or more pairs of return messages to create one or more return message maps; selectively combining the one or more source message maps and the one or more return message maps for each pair of systems being integrated into one or more map groups; receiving a source message from an adapter of a source system of the systems being integrated; determining a first schema of the source message instance and a second schema of a target message to be created; using the first schema and the second schema to retrieve one or more of the map groups corresponding to a first system characterized by the first schema and a second system characterized by the second schema; and executing one or more maps of the one or more map groups using data values in the fields of the source message.

The fourth example method 220 may further specify retrieving a map for identified source and target message schemas; applying mappings of the map, given the data values in the fields of the source message instance (wherein application of the map to a source message yields a target message instance, and wherein the target message instance has its data values set according to the mapping result of each mapping); and sending the target message to the adapter of a target system. Note that a similar process of transformation execution may apply to translating return messages and error messages when those types of messages are communicated between systems.

Figure 13:
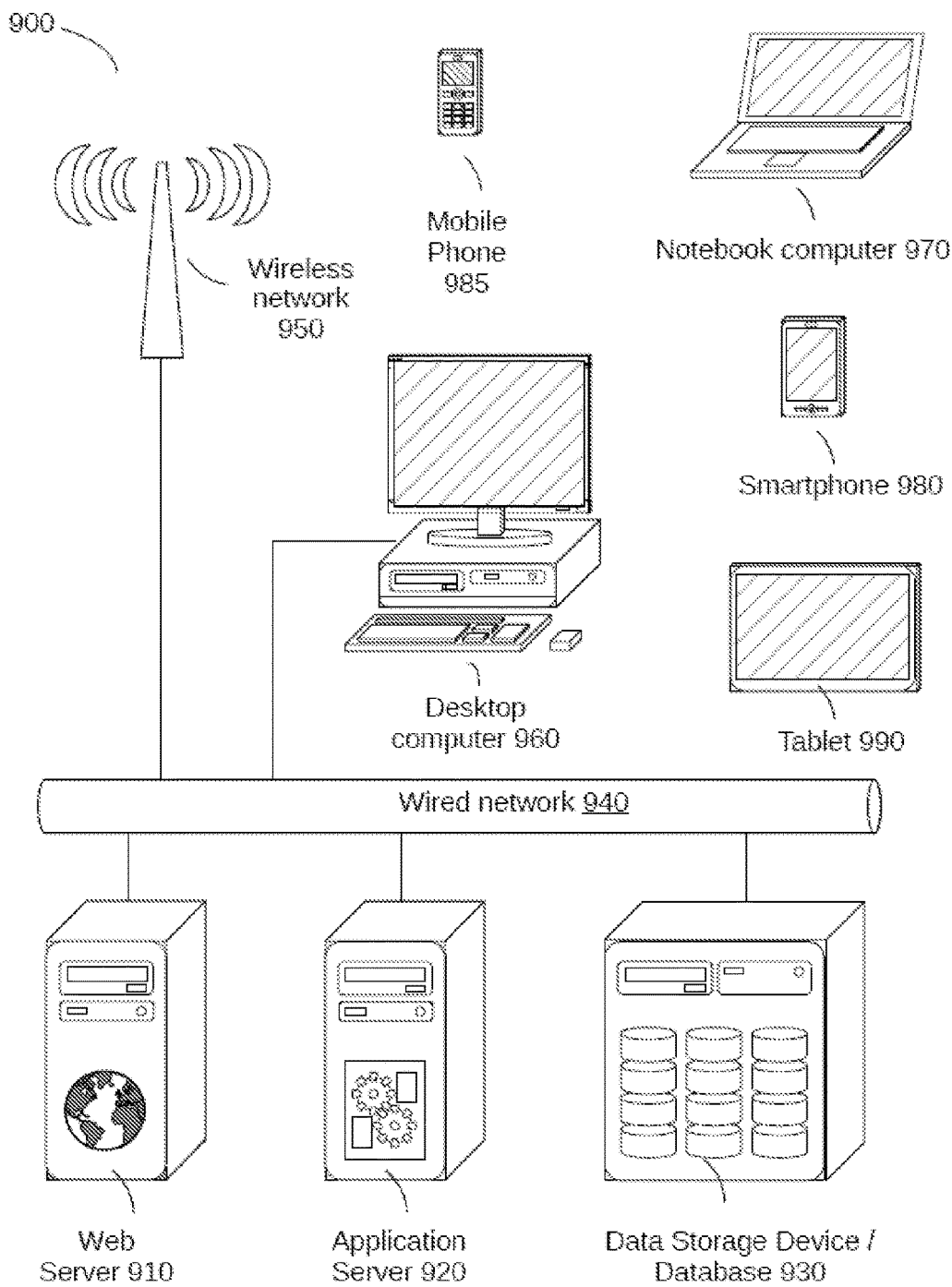
FIG. 13 is a general block diagram of a system and accompanying computing environment usable to implement the embodiments of FIGS. 1-12.

FIG. 13 is a general block diagram of a system and accompanying computing environment usable to implement the embodiments of FIGS. 1-12. The example system 900 is capable of generating and using message transformation maps according to embodiments of the invention. Embodiments may be implemented as standalone applications (for example, residing in a user device) or as web-based applications implemented using a combination of client-side and server-side code.

The general system 900 includes user devices 960-990, including desktop computers 960, notebook computers 970, smart phones 980, mobile phones 985, and tablets 990. The general system 900 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although the system 900 is shown with five user devices, any number of user devices can be supported.

A web server 910 is used to process requests from web browsers and standalone applications for web pages, electronic documents, enterprise data or other content, and other data from the user computers. The web server 910 may also provide push data or syndicated content, such as RSS feeds, of data related to enterprise operations.

An application server 920 operates one or more applications. The applications can be implemented as one or more scripts or programs written in any programming language, such as Java, C, C++, C#, or any scripting language, such as JavaScript or ECMAScript (European Computer Manufacturers Association Script), Perl, PHP (Hypertext Preprocessor), Python, Ruby, or TCL (Tool Command Language). Applications can be built using libraries or application frameworks, such as Rails, Enterprise JavaBeans, or .NET. Web content can created using HTML (HyperText Markup Language), CSS (Cascading Style Sheets), and other web technology, including templating languages and parsers.

The data applications running on the application server 920 are adapted to process input data and user computer requests and can store or retrieve data from data storage device or database 930. Database 930 stores data created and used by the data applications. In an embodiment, the database 930 includes a relational database that is adapted to store, update, and retrieve data in response to SQL format commands or other database query languages. Other embodiments may use unstructured data storage architectures and NoSQL (Not Only SQL) databases.

In an embodiment, the application server 920 includes one or more general-purpose computers capable of executing programs or scripts. In an embodiment, web server 910 is implemented as an application running on the one or more general-purpose computers. The web server 910 and application server 920 may be combined and executed on the same computers.

An electronic communication network 940-950 enables communication between user computers 960-990, web server 910, application server 920, and database 930. In an embodiment, networks 940-950 may further include any form of electrical or optical communication devices, including wired network 940 and wireless network 950. Networks 940-950 may also incorporate one or more local-area networks, such as an Ethernet network, wide-area networks, such as the Internet; cellular carrier data networks; and virtual networks, such as a virtual private network.

The system is one example for executing applications according to an embodiment of the invention. In another embodiment, application server 910, web server 920, and optionally database 930 can be combined into a single server computer application and system. In a further embodiment, virtualization and virtual machine applications may be used to implement one or more of the application server 910, web server 920, and database 930.

In still further embodiments, all or a portion of the web and application serving functions may be integrated into an application running on each of the user computers. For example, a JavaScript application on the user computer may be used to retrieve or analyze data and display portions of the applications.

Figure 14:
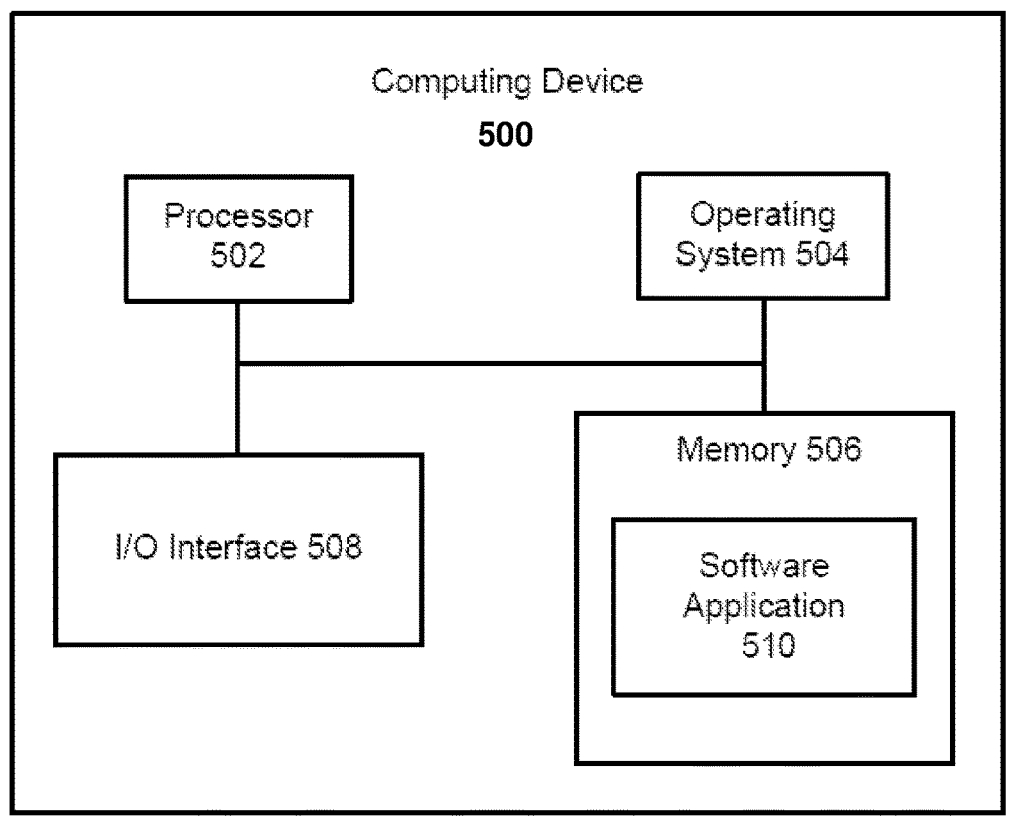
FIG. 14 is a general block diagram of a computing device usable to implement the embodiments of FIGS. 1-13.

FIG. 14 is a general block diagram of a computing device usable to implement the embodiments of FIGS. 1-13. While system 402 of FIG. 14 is described as performing the steps as described in the implementations herein, any suitable component or combination of components of system 402 or any suitable processor or processors associated with system 402 may perform the steps described.

FIG. 14 illustrates a block diagram of an example computing system 500, which may be used for implementations described herein. For example, computing system 500 may be used to implement server devices 910, 920 of FIG. 13 as well as to perform the method implementations described herein. In some implementations, computing system 500 may include a processor 502, an operating system 504, a memory 506, and an input/output (I/O) interface 508. In various implementations, processor 502 may be used to implement various functions and features described herein, as well as to perform the method implementations described herein. While processor 502 is described as performing implementations described herein, any suitable component or combination of components of system 500 or any suitable processor or processors associated with system 500 or any suitable system may perform the steps described. Implementations described herein may be carried out on a user device, on a server, or a combination of both.

Computing device 500 also includes a software application 510, which may be stored on memory 506 or on any other suitable storage location or computer-readable medium. Software application 510 provides instructions that enable processor 502 to perform the functions described herein and other functions. The components of computing system 500 may be implemented by one or more processors or any combination of hardware devices, as well as any combination of hardware, software, firmware, etc.

For ease of illustration, FIG. 14 shows one block for each of processor 502, operating system 504, memory 506, I/O interface 508, and software application 510. These blocks 502, 504, 506, 508, and 510 may represent multiple processors, operating systems, memories, I/O interfaces, and software applications. In various implementations, computing system 500 may not have all of the components shown and/or may have other elements including other types of components instead of, or in addition to, those shown herein.

Although the disclosure has been described with respect to particular embodiments thereof, these particular embodiments are merely illustrative, and not restrictive. For example, while various embodiments discussed herein address mechanisms and methods for integrating two software systems of an enterprise computing environment, embodiments are not limited thereto. Those skilled in the art with access to the present teachings may readily adapt systems and methods discussed herein to facilitate integrating arbitrary numbers of intercommunicating systems or system resources in virtually any type of computing environment, networked or otherwise, including but not limited to wireless communications environments; environments involving software components running on a single computer, and so on.

Furthermore, while various embodiments discuss automatic generation of message maps, embodiments are not limited thereto. In certain cases, an operator may modify or adjust message maps to facilitate system integration. Accordingly, implementations involving a user manually specifying test datasets and manually triggering loading of the test datasets into systems to be integrated and anticipated as being within the scope and spirit of the present teachings.

In general, embodiments employing injection of test datasets into systems to be integrated, as discussed herein, may afford various benefits even without offering automatic message-map generation features. Use of drivers to receive datasets and then output system messages, which can then be compared, may facilitate illustrating differences in data schemas, data element types, and so on, needed to construct highly accurate message maps.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for facilitating integrating software systems, the method comprising:
   using a message instance dataset generator to generate a test dataset in accordance with one or more instantiation rules and a test dataset template, wherein the test dataset template includes a fixed portion describing one or more message schemas and a variable portion describing one or more data values, and wherein the one or more instantiation rules include one or more of:
   (i) a first instantiation rule that specifies that each value in the test dataset must be unique;
   (ii) a second instantiation rule that specifies that values in different test datasets generated from a same test dataset template must differ to enable differentiating test datasets; and
   (iii) a third instantiation rule that specifies that test datasets for each combination of mandatory and optional data items must be created;
   inputting the test dataset to a first software system and a second software system that are to be integrated;
   triggering a first set of one or more source messages from the first software system and a second set of one or more source messages from the second software system based on the test dataset;
   receiving the first set of one or more source messages and the second set of one or more source messages; and
   automatically analyzing data values in the first set of one or more source messages and the second set of one or more source messages to derive, at least in part, a first transformation and a second transformation, respectively, wherein the first transformation specifies a mapping sufficient to transform one or more messages output from the first software system into a format readable by the second software system, and wherein the second transformation specifies a mapping sufficient to transform one or more messages output from the second software system into a format readable by the first software system.

2. The method of claim 1, further including:
   sending a first message of the first set of one or more source messages to the second software system, thereby triggering a first response message from the second software system;
   sending a second message of the second set of one or more source messages to the first software system, thereby triggering a second response message from the first software system; and
   analyzing the first response message and the second response message to determine a third transformation and a fourth transformation, respectively, wherein the third transformation specifies a mapping sufficient to transform one or more response messages from the second software system into one or more corresponding response messages readable by the first software system, and wherein the fourth transformation specifies a mapping sufficient to transform one or more response messages from the first software system into one or more corresponding response messages readable by the second software system.

3. The method of claim 2, further including employing a message transformation map generator to facilitate performing the method of claim 1.

4. The method of claim 3, wherein inputting includes using the message transformation map generator to provide the test dataset to a first driver for the first software system and to a second driver for the second software system to enable generation of the first set of one or more source messages and the second set of one or more source messages, respectively.

5. A non-transitory computer readable medium including instructions executable by one or more processors for:
  using a message instance dataset generator to generate a test dataset in accordance with one or more instantiation rules and a test dataset template, wherein the test dataset template includes a fixed portion describing one or more message schemas and a variable portion describing one or more data values, and wherein the one or more instantiation rules include one or more of:
  (i) a first instantiation rule that specifies that each value in the test dataset must be unique;
  (ii) a second instantiation rule that specifies that values in different test datasets generated from a same test dataset template must differ to enable differentiating test datasets; and
  (iii) a third instantiation rule that specifies that test datasets for each combination of mandatory and optional data items must be created;
  inputting the test dataset to a first software system and a second software system that are to be integrated;
  triggering a first set of one or more source messages from the first software system and a second set of one or more source messages from the second software system based on the test dataset;
  receiving the first set of one or more source messages and the second set of one or more source messages; and
  automatically analyzing data values in the first set of one or more source messages and the second set of one or more source messages to derive, at least in part, a first transformation and a second transformation, respectively, wherein the first transformation specifies a mapping sufficient to transform one or more messages output from the first software system into a format readable by the second software system, and wherein the second transformation specifies a mapping sufficient to transform one or more messages output from the second software system into a format readable by the first software system.

6. The non-transitory computer readable medium of claim 5, further including:
  sending a first message of the first set of one or more source messages to the second software system, thereby triggering a first response message from the second software system;
  sending a second message of the second set of one or more source messages to the first software system, thereby triggering a second response message from the first software system; and
  analyzing the first response message and the second response message to determine a third transformation and a fourth transformation, respectively, wherein the third transformation specifies a mapping sufficient to transform one or more response messages from the second software system into one or more corresponding response messages readable by the first software system, and wherein the fourth transformation specifies a mapping sufficient to transform one or more response messages from the first software system into one or more corresponding response messages readable by the second software system.

7. The non-transitory computer readable medium of claim 6, further including employing a message transformation map generator to facilitate performing the non-transitory computer readable medium of claim 6.

8. The non-transitory computer readable medium of claim 7, wherein inputting includes using the message transformation map generator to provide the test dataset to a first driver for the first software system and to a second driver for the second software system to enable generation of the first set of one or more source messages and the second set of one or more source messages, respectively, and wherein the first driver communicates with one or more first native interfaces of the first software system, and wherein the second driver communicates with one or more second native interfaces of the second software system, and wherein the first driver and the second driver further communicate with the message transformation map generator.

9. The non-transitory computer readable medium of claim 8, wherein the first driver communicates with one or more first native interfaces of the first software system, and wherein the second driver communicates with one or more second native interfaces of the second software system, and wherein the first driver and the second driver further communicate with the message transformation map generator.

10. An apparatus for facilitating integrating software systems, the apparatus comprising:
  one or more processors;
  a tangible processor-readable storage device including instructions for:
  using a message instance dataset generator to generate a test dataset in accordance with one or more instantiation rules and a test dataset template, wherein the test dataset template includes a fixed portion describing one or more message schemas and a variable portion describing one or more data values, and wherein the one or more instantiation rules include one or more of:
  (i) a first instantiation rules that specifies that each value in the test dataset must be unique:
  (ii) a second instantiation rule that specifies that values in different test datasets generated from a same test dataset template must differ to enable differentiating test datasets; and
  (iii) a third instantiation rules that specifies that test datasets for each combination of mandatory and optional data items must be created;
  inputting the test dataset to a first software system and a second software system that are to be integrated;
  triggering a first set of one or more source messages from the first software system and a second set of one or more source messages from the second software system based on the test dataset;
  receiving the first set of one or more source messages and the second set of one or more source messages; and
  automatically analyzing data values in the first set of one or more source messages and the second set of one or more source messages to derive, at least in part, a first transformation and a second transformation, respectively, wherein the first transformation specifies a mapping sufficient to transform one or more messages output from the first software system into a format readable by the second software system, and wherein the second transformation specifies a mapping sufficient to transform one or more messages output from the second software system into a format readable by the first software system.

* * * * *